(12) United States Patent
Terrano

(10) Patent No.: US 11,627,118 B1
(45) Date of Patent: Apr. 11, 2023

(54) UTILIZING INTER-DEVICE COMMUNICATIONS AND USER PERMISSIONS FOR CAPTURING DIGITAL IMAGES AT EVENTS

(71) Applicant: Meta Platforms Technologies, LLC, Menlo Park, CA (US)

(72) Inventor: Mark Terrano, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 685 days.

(21) Appl. No.: 16/583,695

(22) Filed: Sep. 26, 2019

(51) Int. Cl.
| | | |
|---|---|---|
| *H04L 9/40* | (2022.01) | |
| *H04W 4/021* | (2018.01) | |
| *H04N 5/232* | (2006.01) | |
| *G06T 7/00* | (2017.01) | |
| *G06N 20/00* | (2019.01) | |
| *G06F 3/01* | (2006.01) | |
| *H04L 67/10* | (2022.01) | |

(52) U.S. Cl.
CPC .......... *H04L 63/0442* (2013.01); *G06F 3/011* (2013.01); *G06N 20/00* (2019.01); *G06T 7/0002* (2013.01); *H04N 5/23203* (2013.01); *H04N 5/23222* (2013.01); *H04W 4/021* (2013.01); *G06T 2207/20081* (2013.01); *G06T 2207/30168* (2013.01); *H04L 67/10* (2013.01)

(58) Field of Classification Search
CPC ...... H04L 63/0442; H04L 67/10; G06F 3/011; G06N 20/00; G06T 7/0002; G06T 2207/20081; G06T 2207/30168; H04N 5/23203; H04N 5/23222; H04W 4/021
USPC ........................................................ 713/150
See application file for complete search history.

(56) References Cited

U.S. PATENT DOCUMENTS

| | | | |
|---|---|---|---|
| 9,124,730 B2 * | 9/2015 | Kurabayashi | G06V 30/142 |
| 10,942,416 B1 * | 3/2021 | Lu | G02F 1/29 |
| 2015/0227782 A1 * | 8/2015 | Salvador | G06F 16/583 |
| | | | 382/118 |

(Continued)

OTHER PUBLICATIONS

"Pixel 4—The phone that's here to help."; Downloaded Nov. 12, 2019 https://store.google.com/us/?hl=en-US&srp=/us/product/google_clips.

(Continued)

*Primary Examiner* — Loi H Tran
(74) *Attorney, Agent, or Firm* — Keller Preece PLLC

(57) ABSTRACT

The present disclosure relates to methods, systems, and non-transitory computer-readable media for using inter-device communications and user permissions to capture and transmit digital images of users who have opted in for other computing devices capturing their images at an event. For example, the disclosed systems can receive registration information corresponding to a user attending an event, including whether the user opts in to having digital images of the user captured during the event. During the event, the disclosed systems can provide the current location of the user to other computing devices at the event. Upon detecting a trigger, one or more of the computing devices can capture (and encrypt) a digital image of the user and provide the digital image for access by the user. The disclosed systems can also modify a digital image of the user to censor an image of the user from the digital image or prevent computing devices from capturing digital images of the user entirely based on indications provided by the user.

20 Claims, 18 Drawing Sheets

(56) References Cited

U.S. PATENT DOCUMENTS

| | | | | |
|---|---|---|---|---|
| 2016/0358013 A1* | 12/2016 | Carter | .................... | G06F 21/32 |
| 2017/0277831 A1* | 9/2017 | Ruff | ...................... | A61B 6/485 |
| 2018/0261247 A1* | 9/2018 | Bellotti | .................. | G11B 27/10 |
| 2020/0125880 A1* | 4/2020 | Wang | .................... | G06N 20/00 |
| 2020/0136823 A1* | 4/2020 | Montero | .............. | H04L 9/3066 |

OTHER PUBLICATIONS

"Memory Maker: A Disney PhotoPass Product" Downloaded Nov. 12, 2019 https://disneyworld.disney.go.com/memory-maker/.

* cited by examiner

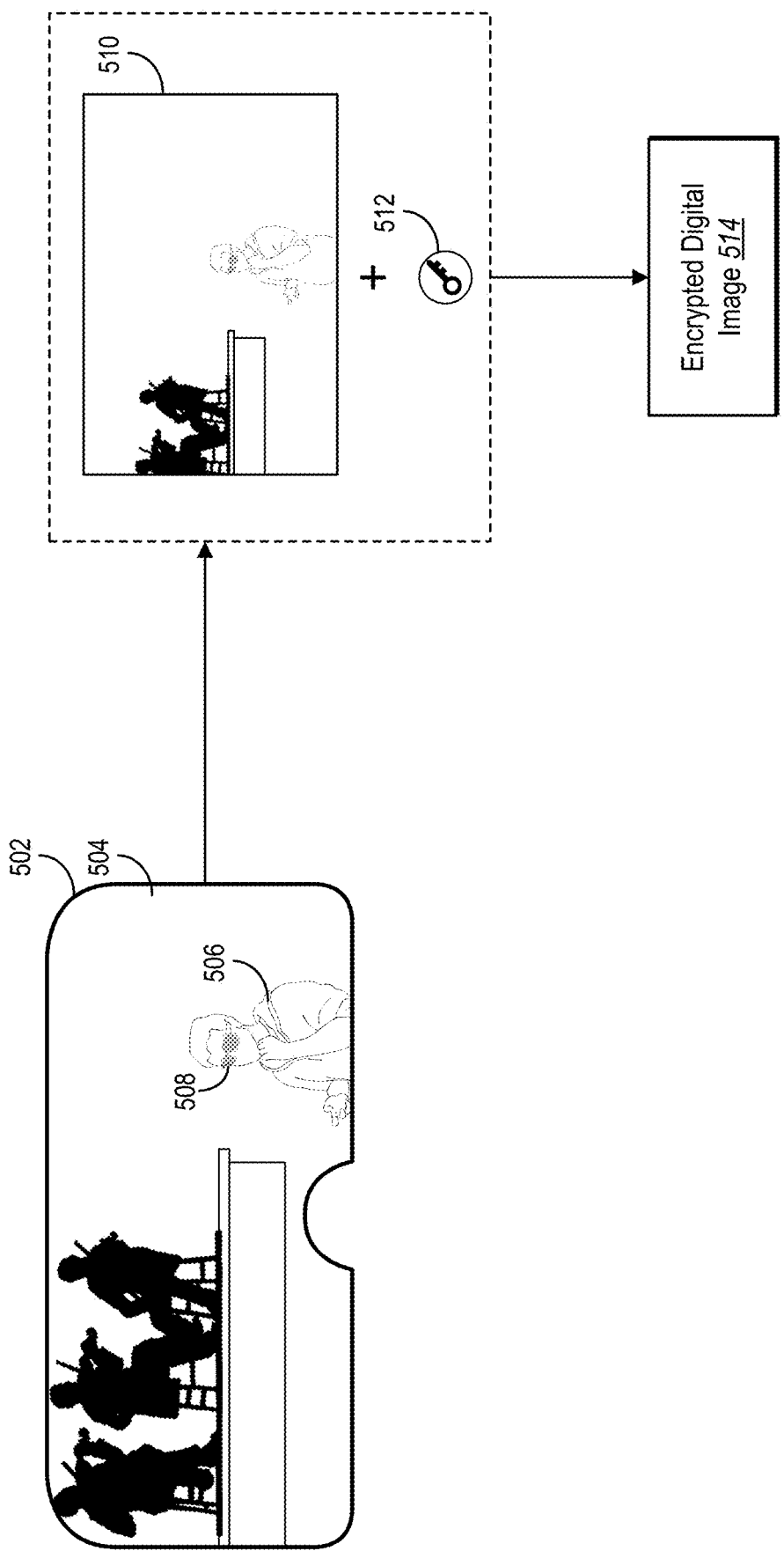

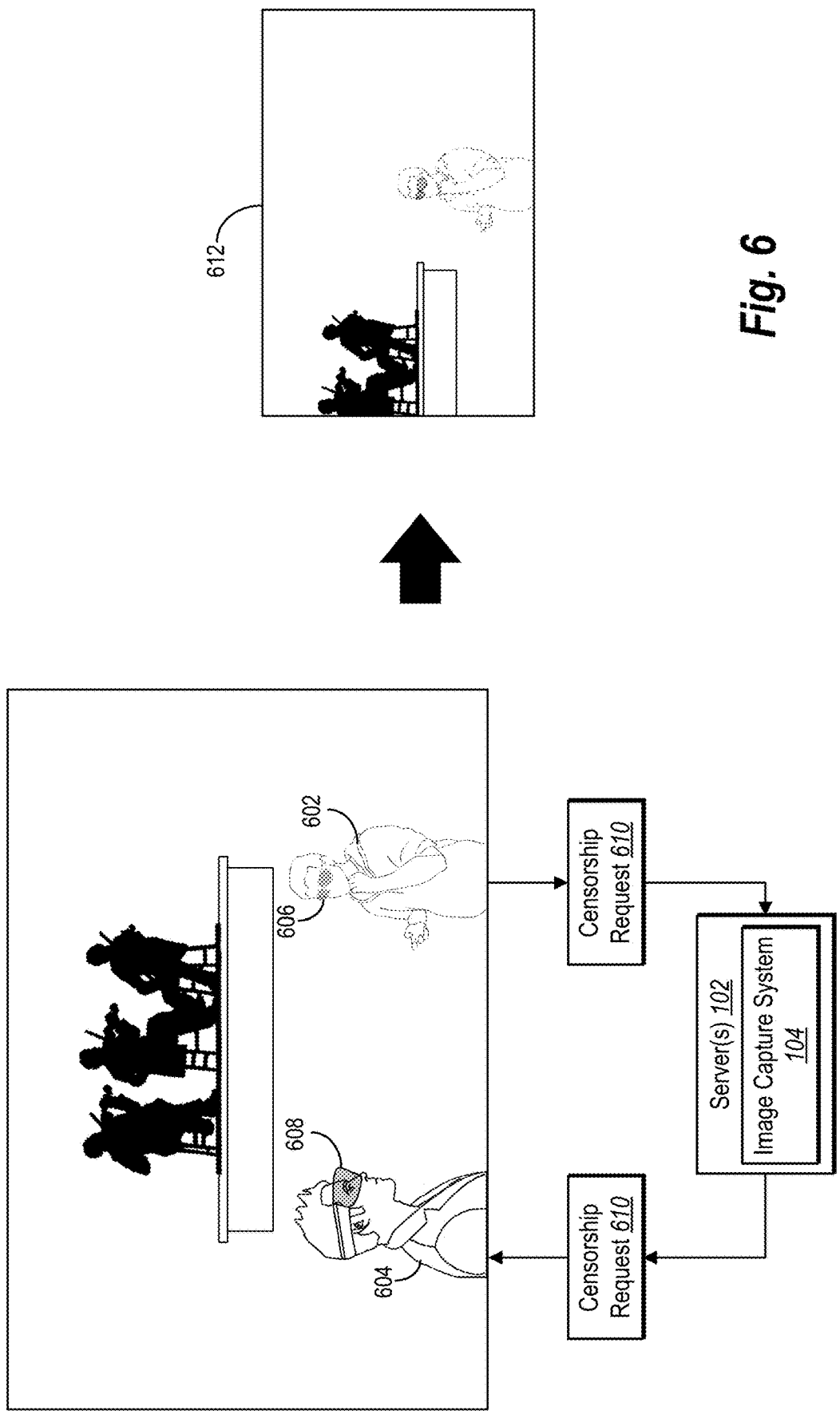

UTILIZING INTER-DEVICE COMMUNICATIONS AND USER PERMISSIONS FOR CAPTURING DIGITAL IMAGES AT EVENTS

BACKGROUND

Recent years have seen significant improvement in hardware and software platforms that improve the ability of a user to capture and/or share digital images. For example, camera systems (e.g., a camera and a corresponding software application) have been integrated into various computing devices, such as mobile computing devices, providing improved accessibility to image-capturing capabilities. Such integration further provides convenient access to computer operations that enable a user to send, receive, view, or edit captured digital images. To illustrate, a user of a mobile computing device having an integrated camera system (e.g., a smartphone) can easily use the mobile computing device to capture a digital image. The user can then use the mobile computing device to immediately view the digital image and, if desired, send the digital image to the computing device of another user.

Despite these advances, however, conventional image capture systems suffer from several technological shortcomings that result in inflexible operation and security concerns. For example, conventional image capture systems are often inflexible in that they fail to capture and/or share digital images without guidance provided via manual user input. To illustrate, conventional systems typically require a user to manually interact with a device having an integrated camera system to capture and share a desired digital image (e.g., select an image-capture option, input recipient information, select a send option, etc.). Such systems present particular difficulty for users who wish to be captured in candid digital images because they generally require the user to provide another with the user's device, thus making the capturing of the digital images known. Conventional systems suffer from additional flexibility issues in that they require a user to personally know or obtain the contact information (e.g., phone number or email address) for another user with whom the user wishes to share a digital image.

In addition to flexibility concerns, conventional image capture systems also operate insecurely. In particular, many conventional image systems allow digital images of individuals to be captured and/or shared without the knowledge of the individuals and possibly regardless of a particular individual's desire to be within the image. For example, an individual attending an event where various attendees are taking photos may wander into the background of one or more of the photos unknowingly. The conventional systems may allow these attendees to subsequently share these photos (e.g., on social media) with others freely. Thus, such conventional systems may violate the privacy wishes of event attendees being captured in these digital images.

These, along with additional problems and issues, exist with regard to conventional image capture systems.

SUMMARY

This disclosure describes one or more embodiments of methods, non-transitory computer readable media, and systems that solve one or more of the foregoing problems and provide other benefits. For example, the disclosed systems utilize inter-device communications and user permissions to flexibly and securely capture and transmit digital images of users who have opted in for other computing devices capturing their images at events or geo-fenced areas. In one or more embodiments, a user can utilize a computing device to register with a platform that the user will be attending a particular event or within a geo-fenced area. The user can further provide one or more image-capture controls to the platform, such as an indication that the user opts in to have other computing devices at the event or geo-fenced area capture digital images of the user. During the event or in the geo-fenced area, computing devices of other users can capture (and encrypt) digital images of the user based on detecting a trigger.

For example, a computing device can capture a digital image upon detecting that the user is in frame of a camera. The computing device can provide the captured digital image for access by the computing device of the user (e.g., via the platform)—in encrypted form to be accessible only to the user or other designated users. In some cases, the capture and transmission of the digital images can occur without deliberate positioning by the user or camera operation handled by the other attending users. Thus, the disclosed systems can securely provide digital images of a user that have been flexibly captured (e.g., without camera operation) by one or more computing devices at the event.

Additional features and advantages of one or more embodiments of the present disclosure are outlined in the following description.

BRIEF DESCRIPTION OF THE DRAWINGS

The detailed description refers to the drawings briefly described below:

FIGS. 5A-5C each illustrate a block diagram of a computing device capturing a digital image of a user at an event based on detecting an image-capture trigger in accordance with one or more embodiments.

FIG. 6 illustrates a block diagram of providing a censorship request corresponding to a user at an event in accordance with one or more embodiments.

DETAILED DESCRIPTION

Figure 1:
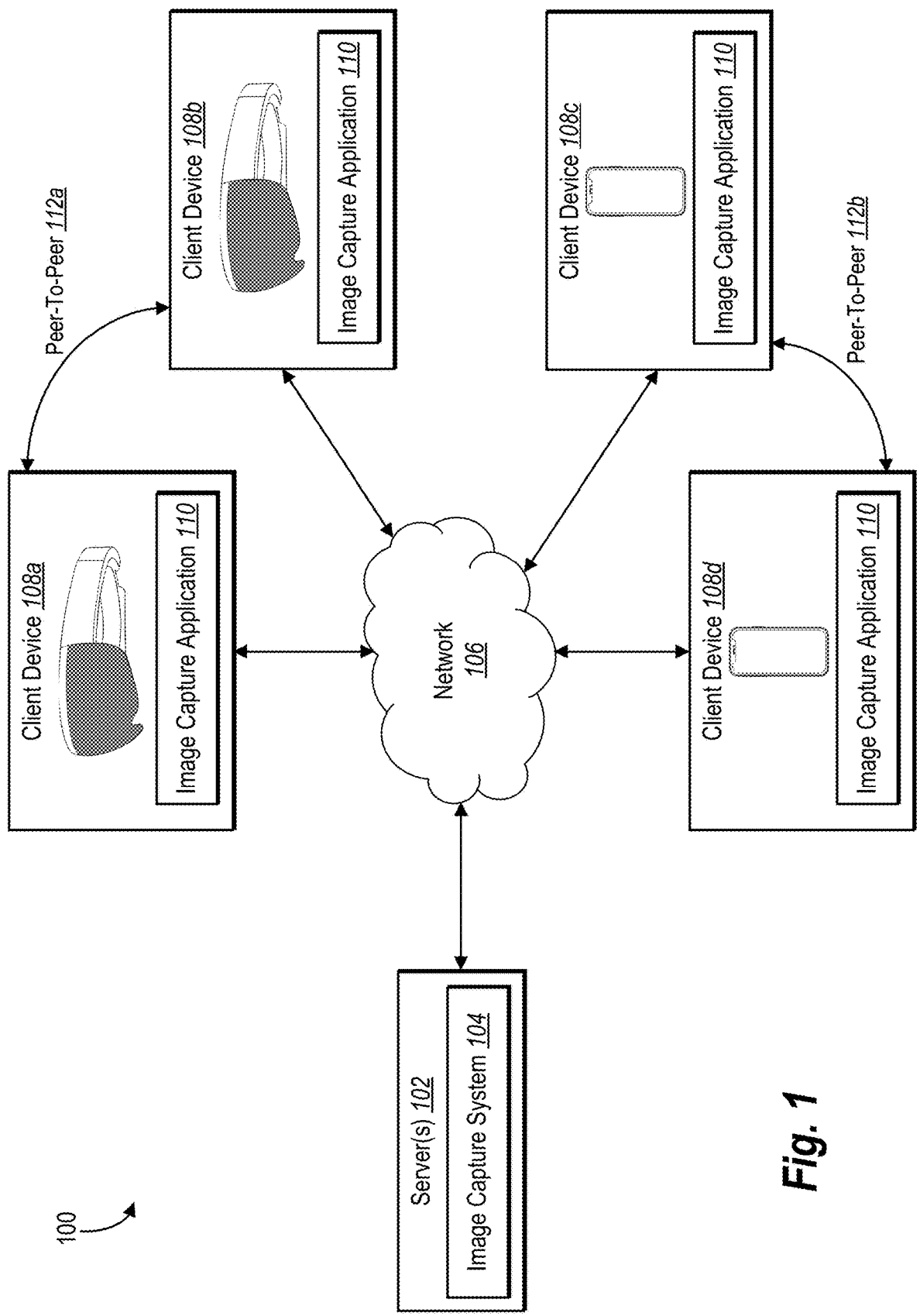
FIG. 1 illustrates an example environment in which an image capture system can operate in accordance with one or more embodiments.

This disclosure describes one or more embodiments of an image capture system for flexibly and securely providing candid digital images of a user captured at an event or geo-fenced area based on inter-device communications and user permissions. For example, the image capture system can receive, from a computing device, registration information regarding an event that a user of the computing device will attend or a geo-fenced area where the user may be located. The image capture system can further receive one or more image-capture controls corresponding to a consent of the user to have other computing devices at the event (or within the geo-fenced area) capture digital images of the user. During the event or in the geo-fenced area, a computing device of another user can capture a digital image of the user based on a trigger, such as detecting that the user is in frame of a camera. The image capture system can receive the digital image and provide the digital image for access by the computing device of the user. In one or more embodiments, the computing device of the other user (or the image capture system) encrypts the digital image to limit access to the user only. In some embodiments, the capture and transmission of digital images occurs behind the scenes (i.e., without input from either user).

To provide an example, in one or more embodiments, the image capture system receives, from a first computing device, an opt-in indication that a user of the first computing device has selected to permit a computing device to capture images of the user at a designated location (e.g., a location of an event). Based on receiving the opt-in indication, the image capture system can transmit, to a second computing device, an image-capture indication to capture an image of the user of the first computing device at the designated location. In one or more embodiments, the image-capture indication includes a user encryption code (e.g., a public encryption key) corresponding to the user of the first computing device. The image capture system can receive, from the second computing device, a digital image of the user of the first computing device, where the digital image is encrypted using the user encryption code. The image capture system can further provide the digital image for access by the first computing device.

To provide another example, a computing device (e.g., the second computing device) can receive an image-capture indication to capture a digital image of a user of a target computing device at a designated location (e.g., an event). The image-capture indication can include a user encryption code corresponding to the user of the target computing device. The computing device can further detect an image-capture trigger for capturing one or more digital images. Based on detecting the image-capture trigger, the computing device can capture one or more digital images of the user of the target computing device at the designated location and encrypt the one or more digital images of the user utilizing the user encryption code corresponding to the user. The computing device can subsequently provide the one or more digital images of the user for access by the target computing device.

As mentioned above, in one or more embodiments, a computing device captures a digital image of a user at an event based on detecting an image-capture trigger. Indeed, in one or more embodiments, a computing device captures a digital image of a user upon detecting that the user is in a point of view for capturing a digital image (e.g., within frame of a camera associated with the computing device). In one or more embodiments, the image capture system provides, to the computing device, location updates regarding a location of the user (e.g., the location of the computing device of the user—referred to as the target computing device), indicating that the user is at a designated location for capturing digital images (e.g., the location of the event). The location updates can further indicate the precise location of the user within the designated location. In some embodiments, the computing device can capture a digital image of the user based on this location.

In one or more embodiments, a computing device can capture a digital image of a user based on one or more other image-capture triggers. For example, a computing device can capture a digital image based on a machine learning model indicating that a particular point of view is favorable for capturing a digital image. The resulting digital image may contain the image of the user (e.g., the user happened to be within the point of view captured). As another example, a particular computing device can capture a digital image based on one or more cues detected from its own respective user. To illustrate, the computing device can detect movement (e.g., using an inertial measurement unit), a voice cue (e.g., laughter), or a physiological cue (e.g., based on a heartbeat) of the respective user and capture a digital image accordingly.

In some embodiments, a particular computing device can transmit an image-capture request to have a digital image captured of its respective user. Similar to the example above, the computing device can transmit the image-capture request based on a movement of the respective user, a voice analysis of the respective user, or a physiological analysis (e.g., a heartbeat analysis) of the respective user. Another computing device at the event can capture a digital image of the user based on receiving the image-capture request.

As further mentioned above, in one or more embodiments, the image capture system manages the capture and transmission of digital images based on user permissions. For example, computing devices at an event can capture an image of a user at the event based on receiving an image-capture indication corresponding to that user. The image capture system can provide the image-capture indication based on the user opting in to having digital images captured of the user. In some embodiments, however, the image capture system provides a censorship request or an image-restriction indication to the computing devices. Based on such a censorship request or image-restriction indication, the computing devices can modify a digital image of the user to censor the image of the user (e.g., by blurring, replacing, or removing the image of the user) or abstain from capturing a digital image of the user, respectively.

In some embodiments, the image capture system further manages how digital images of a user are accessed by other computing devices. As mentioned above, the image capture system can encrypt digital images of a user using a user encryption code corresponding to that user, preventing computing devices not associated with that user from viewing the digital images. Additionally, the image capture system can add a digital image of a user to an event album comprising digital images from the event based on whether or not the user has approved of the inclusion. The image capture system can further share a digital image of a user with other computing devices based on one or more sharing parameters, such as geo-fencing parameters provided by the user.

The image capture system provides several advantages over conventional systems. For example, the image capture system can operate more flexibly than conventional systems. Indeed, by capturing digital images based on image-capture triggers, computing devices can capture digital images of a user at an event without requiring user input. Further, because the image capture system enables computing devices at an event to communicate with one another behind the scenes, digital images of a user can be captured by computing devices that are unknown to the user. Thus, the image capture system enables a user to flexibly receive digital images (e.g., candid images) without the effort required under conventional systems.

Further, the image capture system can operate more securely than conventional systems. In particular, by managing the capture of digital images of a user based on whether the user has opted in, has requested censorship, or has provided an image-capture restriction, the image capture system can ensure that digital images of an event do not violate a user's desire of privacy. Further, by managing how a digital image is shared based on parameters or approval provided by the user, the image capture system securely controls the disbursement of the digital image.

As illustrated by the foregoing discussion, the present disclosure utilizes a variety of terms to describe features and benefits of the image composition system. As used herein, the term "image of a user" (or "image") refers to a visual representation of a user (i.e., a person). In particular, an image of a user can refer to a complete or partial visual representation of a user as captured or generated via a visual medium (e.g., a digital photo, a sketch, a painting, etc.). An image of a user can include an initially-captured or initially-generated visual representation of the user (e.g., an unedited visual representation captured in a digital image) or a derivation of such an initial visual representation (e.g., an edited visual representation from the digital image).

Additionally, as used herein, the term "digital image" refers to a digital visual representation. In particular, a digital image can refer to a digitally-captured or digitally-rendered visual representation of one or more objects, one or more users, and/or a scene. For example, a digital image can depict a digitally-captured or digitally-rendered image of a user.

Further, as used herein, the term "favorable view" refers to a view having an aesthetically pleasing view as determined by a machine learning model or a view having an opportune view as indicated by an image-capture trigger or by a machine learning model. In particular, a favorable view can include a view predicted by a machine learning model (based on historically-favored-training images) to have a measurable degree of popularity amongst one or more groups of individuals. To illustrate, a favorable view can include a view determined to be aesthetically pleasing based on a predicted ability to obtain a desired number of shares, likes, etc. on one or more social media platforms. Alternatively, a favorable view can include a view determined to be timely or opportune based on an image-capture trigger, such as a voice cue or physiological cue. As used herein, the term "favorable image" refers to a digital image that includes a favorable view.

Further, as used herein, the term "opt-in indication" refers to an indication that a user has elected to permit one or more cameras, head-mounted-display devices, or other computing devices to capture an image of the user (e.g., at a designated location). In particular, an opt-in indication can refer to data indicating an agreement by a user to have digital images captured of the user and/or to capture digital images of other users at a designated location. An opt-in indication can be associated with one or more parameters or restrictions. For example, an opt-in indication can include an agreement to participate in image capturing activity during an event where the scope of the agreement is limited to the location of the event and during the occurrence of the event.

Additionally, as used herein, the term "designated location" refers to a user-selected location. In particular, a designated location can refer to a location (e.g., an event location) at which a user has agreed to have his or her image captured. For example, a designated location can include the location of an event. A designated location can be defined by a specified set of coordinates (e.g., a particular location within an event venue), an area within a range of coordinates (e.g., a defined area that includes the event venue or an area within the event venue), or an identifier associated with a location (e.g., the name of the event venue).

As used herein, the term "event" refers to a gathering of people or a planned meeting or occasion at a designated location. In particular, an event can refer to a private gathering of people or a gathering of people for which an individual pays admission. For example, an event can include, but is not limited to a concert, a sporting event, a trade show, or a convention. As used herein, the term "event album" refers to a collection of digital images for an event. In particular, an event album can refer to a collection of one or more digital images captured at a particular event.

Additionally, as used herein, the term "user encryption code" refers to a medium for encrypting data. In particular, a user encryption code can refer to an apparatus, process, algorithm, or function for converting data into encrypted data. More specifically, a user encryption code can refer to an encryption code that is associated with (e.g., is unique to) a particular user. For example, a user encryption code can refer to a single encryption key or to a key pair (e.g., a public encryption key and a corresponding private encryption key) associated with a user.

Further, as used herein, the term "image-capture trigger" refers to an indication to capture a digital image. In particular, an image-capture trigger can refer to data detected or received by a computing device to execute one or more instructions for capturing a digital image. More detail regarding various usable image-capture triggers discussed below.

As used herein, the term "image-capture indication" refers to an indication to capture an image of a user. In particular, an image-capture indication can refer to data indicating a permission or an instruction to a computing device to capture an image of a user of another computing device. An image-capture indication can be associated with a user that has provided an opt-in indication and can be limited by the parameters or restrictions associated with the opt-in indication (e.g., limited to the location of an event and during the occurrence of the event).

Relatedly, as used herein, the term "image-restriction indication" refers to an indication to not capture an image of a user. In particular, an image-restriction indication can refer to data indicating a denial of permission or an instruction to a computing device to not capture an image of a user of another computing device. The scope of the restriction can be limited to the location of the event and during the occurrence of the event.

Similarly, as used herein, the term "censorship request" refers to an indication or request to censor an image of a user. In particular, a censorship request can refer to data indicating a request to modify a digital image having an image of a user so that the image of the user is unrecognizable. For example, a censorship request can include a request to blur, remove, or replace an image of a user captured in a digital image.

As used herein, the term "image-capture request" refers to a request to capture an image of a user. In particular, an image-capture request can refer to data indicating a request, originating from a computing device of a user, to capture an image of the user.

Further, as used herein, the term "image-share request" refers to a request to share a digital image with one or more other users. In particular, an image-share request can refer to data indicating a request from one computing device to share one or more digital images associated with that computing device (e.g., associated with a user of the computing device) with one or more other computing devices of other users.

Additionally, as used herein, the term "geo-fencing parameter" refers to a parameter indicating or demarcating a geographical boundary. In particular, a geo-fencing parameter can refer to a data parameter indicating or demarcating a virtual boundary (e.g., defined by longitude and latitude) that creates a separation between sides of the boundary. A geo-fencing parameter can correspond to the sharing of data (e.g., digital images). For example, a geo-fencing parameter can enable a first set of sharing options for a computing device when on one side of the boundary and a second set of sharing options (or a lack of options) for the computing device when on the other side of the boundary. To illustrate, sharing options enabled (or disabled) based on a position of a computing device with respect to a boundary set by a geo-fencing parameter can correspond to other users with which the computing device can share data (e.g., a digital image).

As used herein, the term "head-mounted-display device" (or simply "head-mounted display") refers to a wearable device capable of displaying digital content. In particular, a head-mounted-display device can refer to a wearable device that is positioned on a user's head capable of displaying (or presenting) digital content such as graphics, images, video, sound, etc. For instance, a head-mounted-display device can include a virtual reality headset, mixed reality headset, augmented reality glasses, smart glasses, and/or a head-embedded computing device.

Additionally, as used herein, the term "augmented reality display" refers to a composite display composed of computer-generated and real-world elements. In particular, an augmented reality display can refer to a display superimposing one or more computer-generated elements (i.e., "AR elements") onto a real-world view and/or scene that is being observed by a user.

Moreover, as used herein, the term "machine learning model" refers to a computer representation or an algorithm that can be tuned (e.g., trained) based on inputs to approximate unknown functions. In particular, a machine learning model can refer to a model that utilizes algorithms to learn from, and make predictions on, known data by analyzing the known data to learn to generate outputs that reflect patterns and attributes of the known data. For instance, a machine learning model can include, but is not limited to, a neural network (e.g., a convolutional neural network and/or deep learning neural network), decision tree, association rule learning, inductive logic programming, support vector learning, Bayesian network, regression-based model, principal component analysis, and/or a combination thereof.

Additional detail regarding the image capture system will now be provided with reference to the figures. For example, FIG. 1 illustrates a schematic diagram of an exemplary system environment ("environment") 100 in which an image capture system 104 can be implemented. As illustrated in FIG. 1, the environment can include a server(s) 102, a network 106, and client devices 108a-108d.

Although the environment 100 of FIG. 1 is depicted as having a particular number of components, the environment 100 can have any number of additional or alternative components (e.g., any number of servers, client devices, or other components in communication with the image capture system 104 via the network 106). Similarly, although FIG. 1 illustrates a particular arrangement of the server(s) 102, the network 106, and the client devices 108a-108d, various additional arrangements are possible.

The server(s) 102, the network 106, and the client devices 108a-108d may be communicatively coupled with each other either directly or indirectly (e.g., through the network 106 discussed in greater detail below in relation to FIG. 16). Moreover, the server(s) 102 and the client devices 108a-108d may include a variety of computing devices (including one or more computing devices as discussed in greater detail with relation to FIG. 16).

As mentioned above, the environment 100 includes the server(s) 102. The server(s) 102 can generate, store, receive, and/or transmit data, including digital images and communications regarding capturing digital images. For example, the server(s) 102 can receive an opt-in indication from one client device (e.g., one of the client devices 108a-108d) and transmit an image-capture indication to another client device (e.g., one of the client devices 108a-108d). In one or more embodiments, the server(s) 102 comprises a data server. The server(s) 102 can also comprise a communication server or a web-hosting server.

As shown in FIG. 1, the server(s) 102 include the image capture system 104. In particular, in one or more embodiments, the image capture system 104 utilizes the server(s) 102 to receive and transmit data and/or communications regarding capturing digital images based on inter-device communications and user permissions. For example, the image capture system 104 can use the server(s) 102 to identify (e.g., receive) communications transmitted from a computing device and then operate based on the communications received.

For example, in one or more embodiments, the image capture system 104, via the server(s) 102, receives an opt-in indication from a first computing device (e.g., a client device) that a user of the first computing device has selected to permit one or more computing devices to capture images of the user at a designated location (e.g., the location of an event). Based on receiving the opt-in indication, the image capture system 104 can, via the server(s) 102, transmit an image-capture indication to a second computing device to capture an image of the user of the first computing device at the designated location. In return, the image capture system 104 can, via the server(s) 102, receive a digital image of the user of the first computing device and then provide the digital image for access by the first computing device.

In one or more embodiments, the client devices 108a-108d include computer devices that can capture digital images and transmit the digital images to other computer devices. For example, the client devices 108a-108d can include head-mounted-display devices (including those capable of providing an augmented reality display), smartphones, tablets, desktop computers, laptop computers, or other electronic devices, including electronic devices capable of capturing digital images or providing an augmented reality display. The client devices 108a-108d can include one or more applications (e.g., the image capture application 110) that can enable using the device to capture, transmit, receive, view and/or edit digital images. For example, the image capture application 110 can include a software application installed on the client devices 108a-108d. Additionally, or alternatively, the image capture application 110 can include a software application hosted on the server(s) 102, which may be accessed by the client devices 108a-108d through another application, such as a browser.

As shown in FIG. 1, in one or more embodiments, the client devices 108a-108d can communicate directly with one another via a peer-to-peer connection (for simplicity, only the peer-to-peer connections 112a-112b are shown). For example, in some embodiments, a client device relies solely on a peer-to-peer connection to communicate with other client devices. In some instances, a client device attempts to establish a peer-to-peer connection with another client device and, if a peer-to-peer connection is unavailable, establishes a connection with the other client device via the network 106 (e.g., using the server(s) 102). In some embodiments, the client device relies on a peer-to-peer connection to transmit and/or receive some communications and relies on the network 106 to transmit and/or receive other communications.

The image capture system 104 can be implemented in whole, or in part, by the individual elements of the environment 100. Indeed, although FIG. 1 illustrates the image capture system 104 implemented with regard to the server(s) 102, different components of the image capture system 104 can be implemented in a variety of the components of the environment 100. For example, one or more components of the image capture system 104—including all components of the image capture system 104—can be implemented by a client device (e.g., one of the client devices 108a-108d). Example components of the image capture system 104 will be discussed in more detail with regard to FIG. 13 below.

Figure 2:
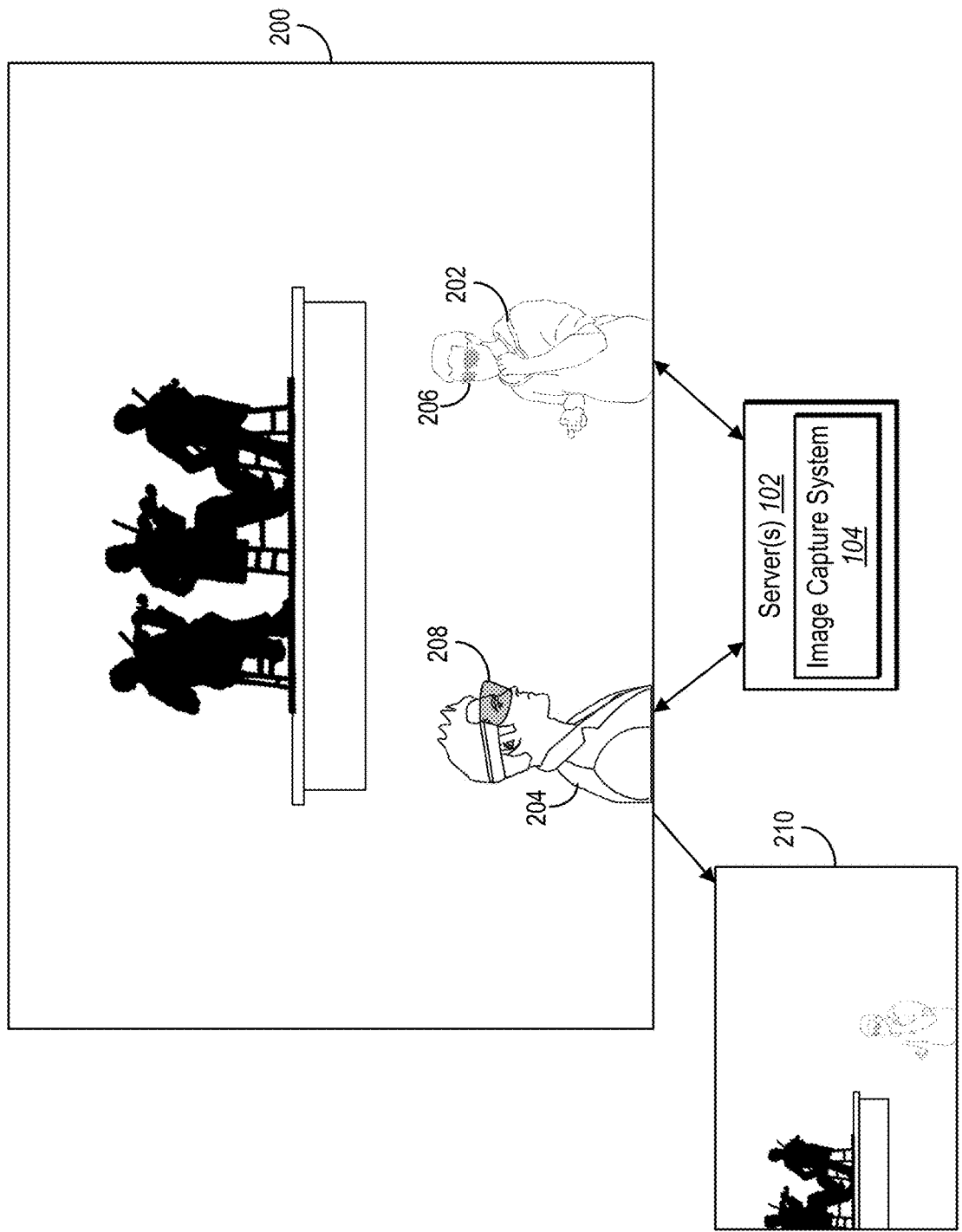
FIG. 2 illustrates a block diagram of an image capture system managing the capture of a digital image of a user at an event in accordance with one or more embodiments.

As mentioned above, the image capture system 104 can manage how computing devices at an event capture and transmit digital images of users attending the event. FIG. 2 illustrates a diagram of the image capture system 104 managing a computing device capturing and transmitting a digital image of a user at an event in accordance with one or more embodiments.

As shown in FIG. 2, a first user 202 and a second user 204 are attending an event 200. Further, the first user 202 has a first computing device 206, and the second user 204 has a second computing device 208. As shown in FIG. 2, the first computing device 206 and the second computing device 208 include head-mounted-display devices. In one or more embodiments, the first computing device 206 and/or the second computing device 208 are capable of providing an augmented reality display.

It should be noted, however, that the first and second computing devices 206 and 208 can include a variety of different computing devices as discussed above. It should further be noted that, although FIG. 2 illustrates the first and second computing devices 206 and 208 to be associated with (e.g., worn or carried by) a particular user attending the event, the first and second computing devices 206 and 208 can be unassociated with event attendees in some embodiments. For example, in some embodiments, a computing device used for capturing digital images is associated with the event itself (i.e., set up and/or managed by event staff).

As further shown in FIG. 2, the image capture system 104 communicates with the first computing device 206 and the second computing device 208. Indeed, the image capture system 104 can transmit and/or receive various types of data or other communications to and/or from the first computing device 206 and the second computing device 208. For example, the image capture system 104 can transmit and/or receive opt-in indications, image-capture indications, censorship requests, image-restriction indications, image-capture requests, approval indications, or digital images, as discussed below.

As further illustrated in FIG. 2, the second computing device 208 captures a digital image 210 of the first user 202. As discussed below, the second computing device 208 can capture the digital image 210 based on the first user 202 opting in to having other computing devices at the event 200 capture images of the first user 202. Indeed, in one or more embodiments, the first user 202 registers the event with the image capture system 104 and provides an opt-in indication via the registration process. As discussed below, the second computing device 208 can capture the digital image 210 further based on detecting an image-capture trigger.

In one or more embodiments, the second computing device 208 captures a series of digital images of the first user 202. For example, upon detecting an image-capture trigger, the second computing device 208 can execute a burst mode to rapidly capture a series of digital images. In some embodiments, the second computing device 208 captures a digital video that includes the first user 202.

In one or more embodiments, the image capture system 104 receives the digital image 210 of the first user 202 from the second computing device 208 and provides the digital image 210 for access by the first computing device 206. For example, the image capture system 104 can transmit the digital image 210 directly to the first computing device 206. In some embodiments, however, the image capture system 104 stores the digital image 210 (whether on the server(s) 102 or on a third-party system) for the first computing device 206 to access (e.g., using a user account associated with the first user 202).

In some embodiments (e.g., where the image capture system 104 stores the digital image 210), upon receiving the digital image 210, the image capture system 104 transmits an image notification to the first computing device 206 indicating that the digital image 210 is available for access. The image capture system 104 can transmit the image notification immediately upon receiving the digital image 210 or transmit the image notification at a set time. For example, in one or more embodiments, the image capture system 104 waits until the end of the day or until the event 200 has completed and transmits an image notification corresponding to all digital images captured of the first user 202 during the event 200.

In FIG. 2, the first computing device 206 has a role of a target computing device in that the first computing device 206 is associated with the first user 202 who is the target of the second computing device 208 for capturing a digital image. However, if the second user 204 opted in to having digital images captured at the event 200, then the second computing device 208 could also be a target computing device for capturing digital images. Indeed, a plurality of users could be attending the event 200 where a number of the users have opted in. Thus, the computing devices of a given user can capture digital images of the other users while digital images of the given user are also captured.

Figure 3:
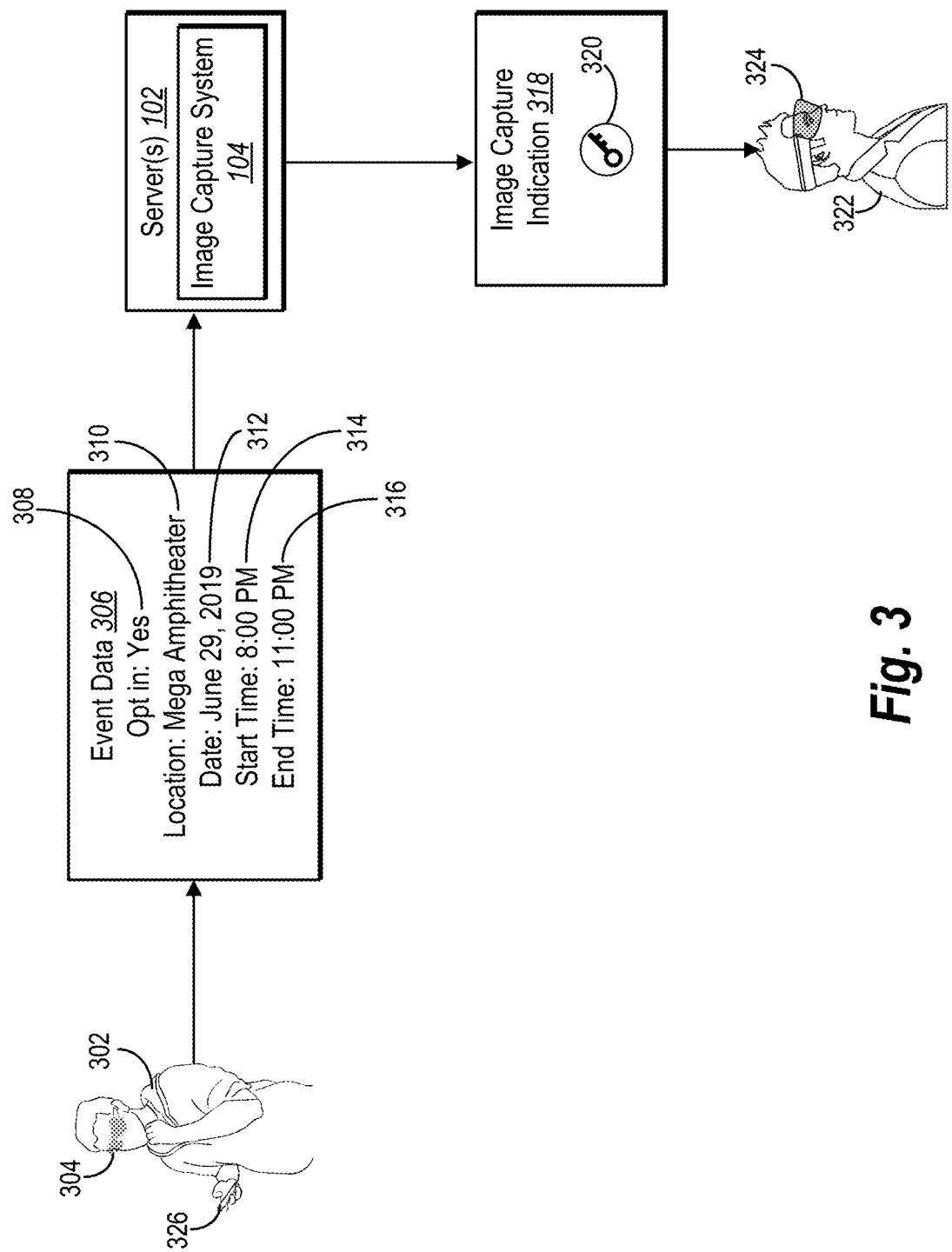
FIG. 3 illustrates a block diagram of receiving registration information corresponding to an event from a user in accordance with one or more embodiments.

As stated above, a user attending an event can register the event with the image capture system 104. FIG. 3 illustrates a block diagram of the image capture system 104 receiving registration information (i.e., event data) from a user in accordance with one or more embodiments.

As illustrated in FIG. 3, a first user 302 can utilize a first computing device 304 to submit event data 306 to register an event with the image capture system 104. Where the first computing device 304 includes a head-mounted-display device providing an augmented reality display, the first user 302 can enter and submit the event data 306 by interacting with one or more augmented reality elements. For example, in one or more embodiments, the first user 302 interacts with the augmented reality elements via voice commands or commands submitted via eye tracking. In some embodiments, the first user 302 utilizes a controller 326 associated with the head-mounted-display device to interact with the augmented reality elements. In some embodiments, the first user 302 utilizes a separate computing device to submit the event data 306 (i.e., separate from the computing device the first user 302 intends to bring to the event).

In one or more embodiments, the first user 302 submits the event data 306 at a time before the event begins. In some embodiments, however, the first user 302 can submit the event data 306 at a time during the event (e.g., upon arrival to the event or near the end of an event).

As shown in FIG. 3, the event data 306 includes an opt-in indication 308. In one or more embodiments, the opt-in indication 308 indicates that the first user 302 has selected to permit other computing devices at the event to capture images of the user. In some embodiments, the opt-in indication 308 further indicates that the first user 302 is willing to capture digital images of other users at the event using the first computing device 304.

Rather than opting in to having digital images captured during the event, the first user 302 can select to "opt-out" via an opt-out indication. Indeed, the opt-out indication can indicate that the first user 302 does not wish to have digital images captured of the first user 302 during the event. In some embodiments, the first user 302 can indicate a willingness to capture digital images of other users at the event but opt-out of having digital images of the first user 302 captured.

As further shown in FIG. 3, the event data 306 further includes a designated location 310 corresponding to a location of the event, an event date 312, an event start time 314, and an event end time 316. In one or more embodiments, the event data 306 includes more or less information. For example, the first user 302 can submit a name of the event, and the image capture system 104 can determine the location, date, time, etc. based on the submitted name. As another example, the first user 302 can specify a desired type of digital image the first user 302 wishes to receive (e.g., filters to apply, a desired background, whether or not the first user 302 wants other attendees in digital images captured of the first user 302, etc.). Further, in one or more embodiments, the event data 306 can define other information the first user 302 wishes to transmit and/or receive (e.g., name, a digital business card, contact information, etc.).

Based on receiving the event data 306, the image capture system 104 can store the event data 306. The image capture system 104 can also transmit an image-capture indication 318 to a second computing device 324 of a second user 322 attending the event. Indeed, in some embodiments, the image capture system 104 transmits the image-capture indication 318 to all other computing devices (or a subset of computing devices) attending the event. In one or more embodiments, the image capture system 104 transmits the image-capture indication 318 before the event begins. In some embodiments, the image capture system 104 transmits the image-capture indication 318 at the time the event begins or during the event.

As further shown in FIG. 3, the image-capture indication 318 includes a user encryption code 320 corresponding to the first user 302. Indeed, in one or more embodiments, the first user 302 provides the user encryption code 320 with the event data 306. In some embodiments, however, the image capture system 104 stores the user encryption code 320 (e.g., in a user account corresponding to the first user 302). Accordingly, the image capture system 104 can retrieve the user encryption code 320 upon receiving the event data 306. As mentioned above, in one or more embodiments, the user encryption code 320 includes a public encryption key corresponding to the first user 302 and further corresponding to a private encryption key of the first user 302.

Figure 4:
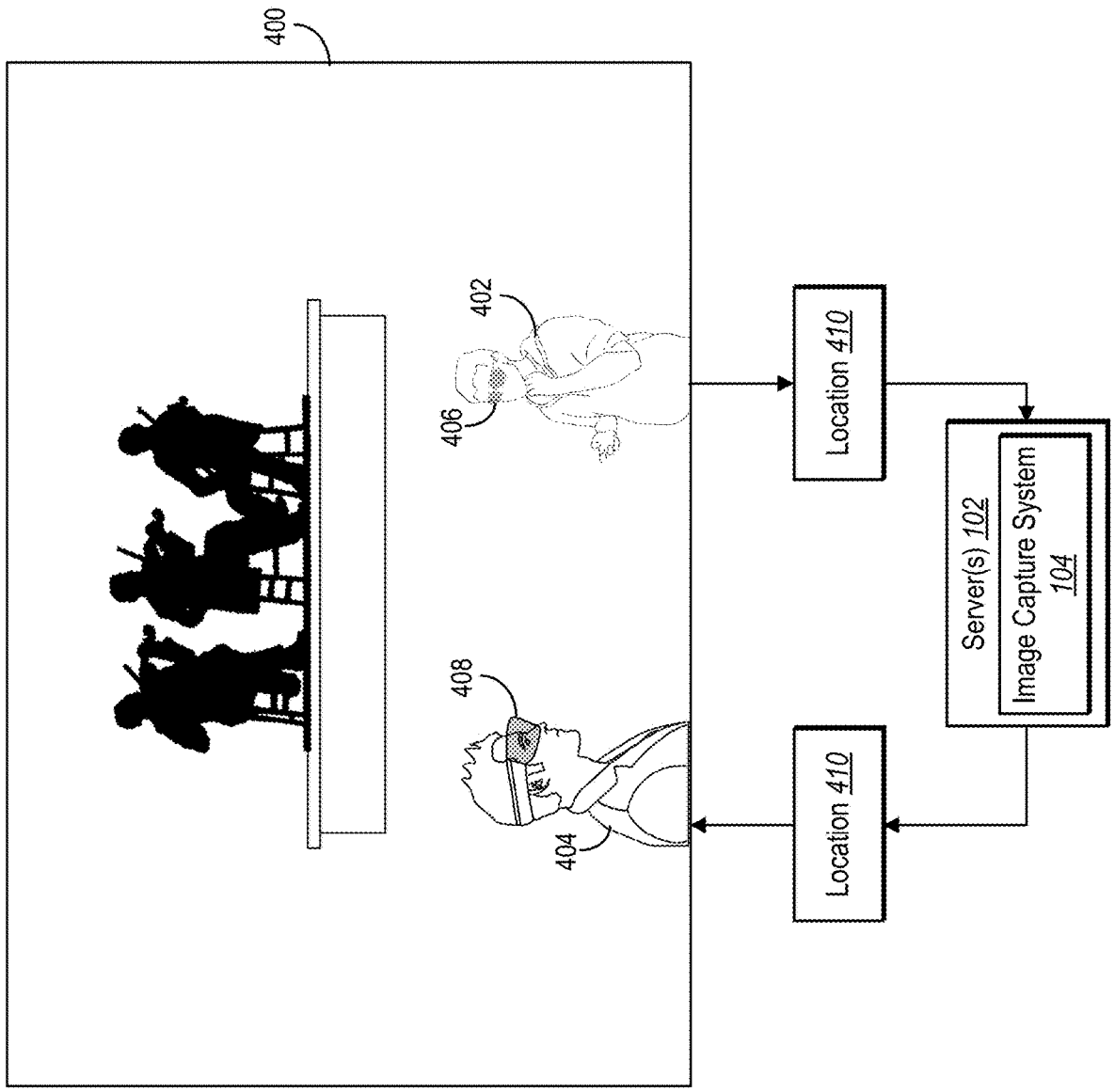
FIG. 4 illustrates providing a location of a first user at an event to a second user at the event in accordance with one or more embodiments.

In one or more embodiments, the image capture system 104 provides, to computing devices at an event, the location of a user at the event. In particular, the image capture system 104 can provide the location of the user based on the location of the computing device of that user. FIG. 4 illustrates the image capture system 104 providing a location of a first user 402 at an event 400 to a second user 404 at the event 400 in accordance with one or more embodiments.

Indeed, as shown in FIG. 4, the image capture system 104 receives, from a first computing device 406 of the first user 402, a location 410 of the first user 402 (i.e., a location of the first computing device 406). In one or more embodiments, the location 410 generally indicates that the first user 402 is located at the event 400. For example, the first computing device 406 can provide the location 410 once the first user 402 arrives at the event 400 and later provide an additional indication when the first user 402 has left the event 400. In some embodiments, however, the first computing device 406 provides the location 410 as part of a series of regular location updates. For example, the first computing device 406 can periodically transmit a current location of the first user 402 to the image capture system 104 while the first user 402 is at the event 400. In one or more embodiments, the first computing device 406 implements (or operates as part of) a simultaneous location and mapping (SLAM) system to determine the current location of the first user 402.

As shown in FIG. 4, the image capture system 104 transmits the location 410 of the first user 402 to a second computing device 408 of the second user 404. Indeed, in one or more embodiments, the image capture system 104 provides the location 410 of the first user 402 as part of a series of periodic location updates. By transmitting the location 410 of the first user 402 to the second computing device 408, the image capture system 104 can indicate that the first user 402 is at a designated location for image capture (e.g., at the event 400). Further, by transmitting the location 410 of the first user 402, the image capture system 104 can provide the second computing device 408 with the current location of the first user 402.

The second computing device 408 can utilize the location 410 of the first user 402 to identify the first user 402. For example, in one or more embodiments, by receiving the current location of the first user 402 via location updates (as well as knowing its own location), the second computing device 408 can determine the location of the first user 402 relative to the location of the second user 404. Thus, when a user is in view of the second computing device 408, the second computing device 408 can determine whether or not the user is the first user 402 based on the current location of the first user 402. Accordingly, when capturing a given digital image (e.g., where capturing an image of the first user 402 was not the purpose), the second computing device 408 can determine whether the digital image includes an image of the first user 402.

Though not shown, in one or more embodiments, the image capture system 104 also receives, from the first computing device 406, an orientation of the first user 402 (e.g., an orientation of the first computing device 406). The image capture system 104 can transmit the orientation of the first user 402 to the second computing device 408. Based on the orientation of the first user 402, the second computing device 408 can determine if the first user 402 is facing, at least partially, the second computing device 408. Specifically, the second computing device 408 can determine if the face of the first user 402 is within view of a camera of the second computing device 408. In one or more embodiments, the second computing device 408 captures a digital image of the first user 402 based on whether the first user 402 is facing the second computing device 408.

Further, though FIG. 4 illustrates the first computing device 406 providing the location 410 via the image capture system 104, the first computing device 406 can provide the location 410 directly to the second computing device 408 in one or more embodiments. For example, in some embodiments, the first computing device 406 constantly or periodically transmits a signal to other computing devices within range. The signal can contain data that includes the location 410 and/or an orientation of the first user 402. In one or more embodiments, the first computing device 406 establishes a peer-to-peer connection with the second computing device 408 and transmits the location 410 and/or the orientation of the first user 402 via the peer-to-peer connection. Peer-to-peer communication will be discussed in more detail below with regard to FIG. 12.

Figure 5B:
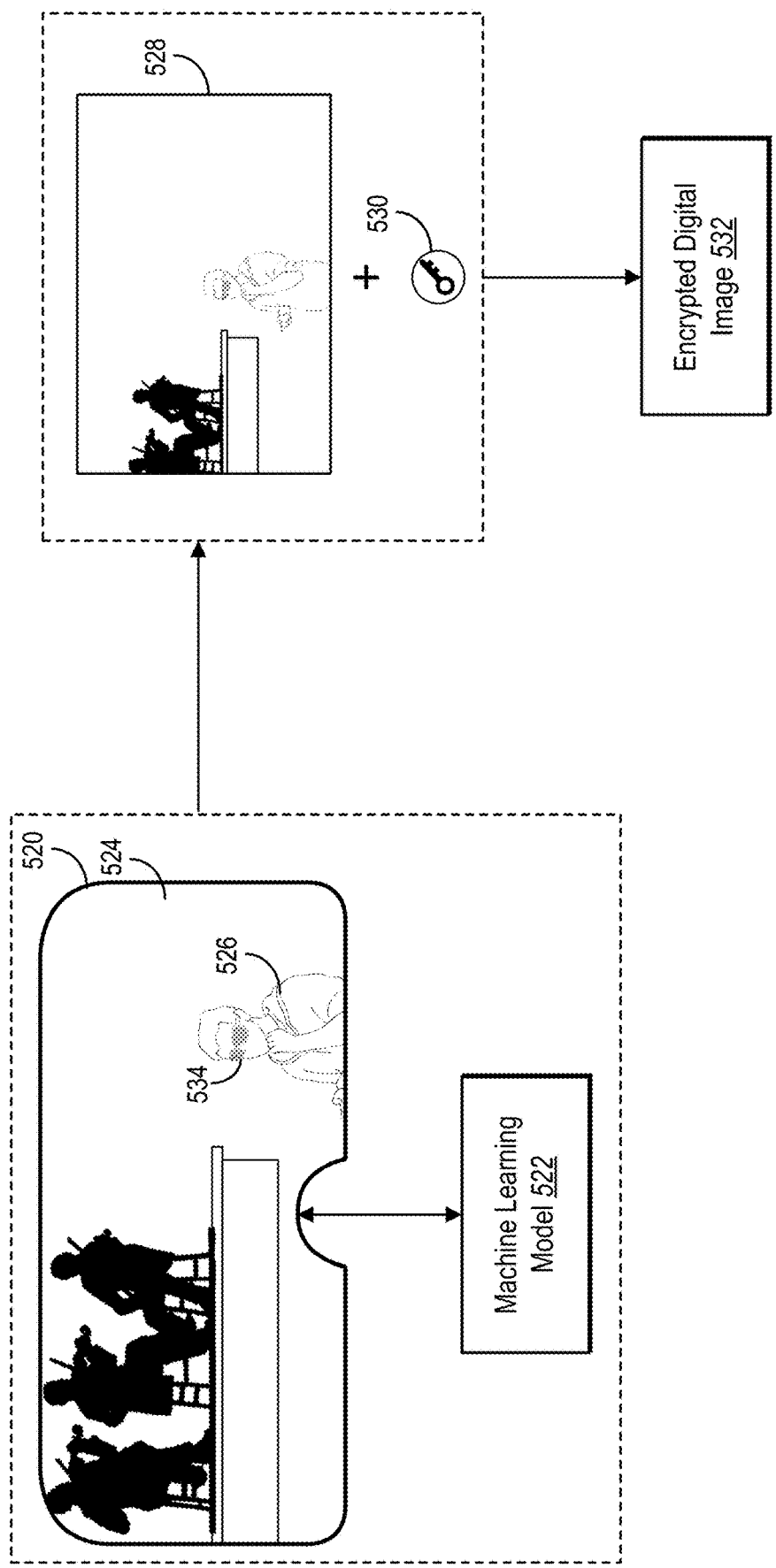
Figure 5C:
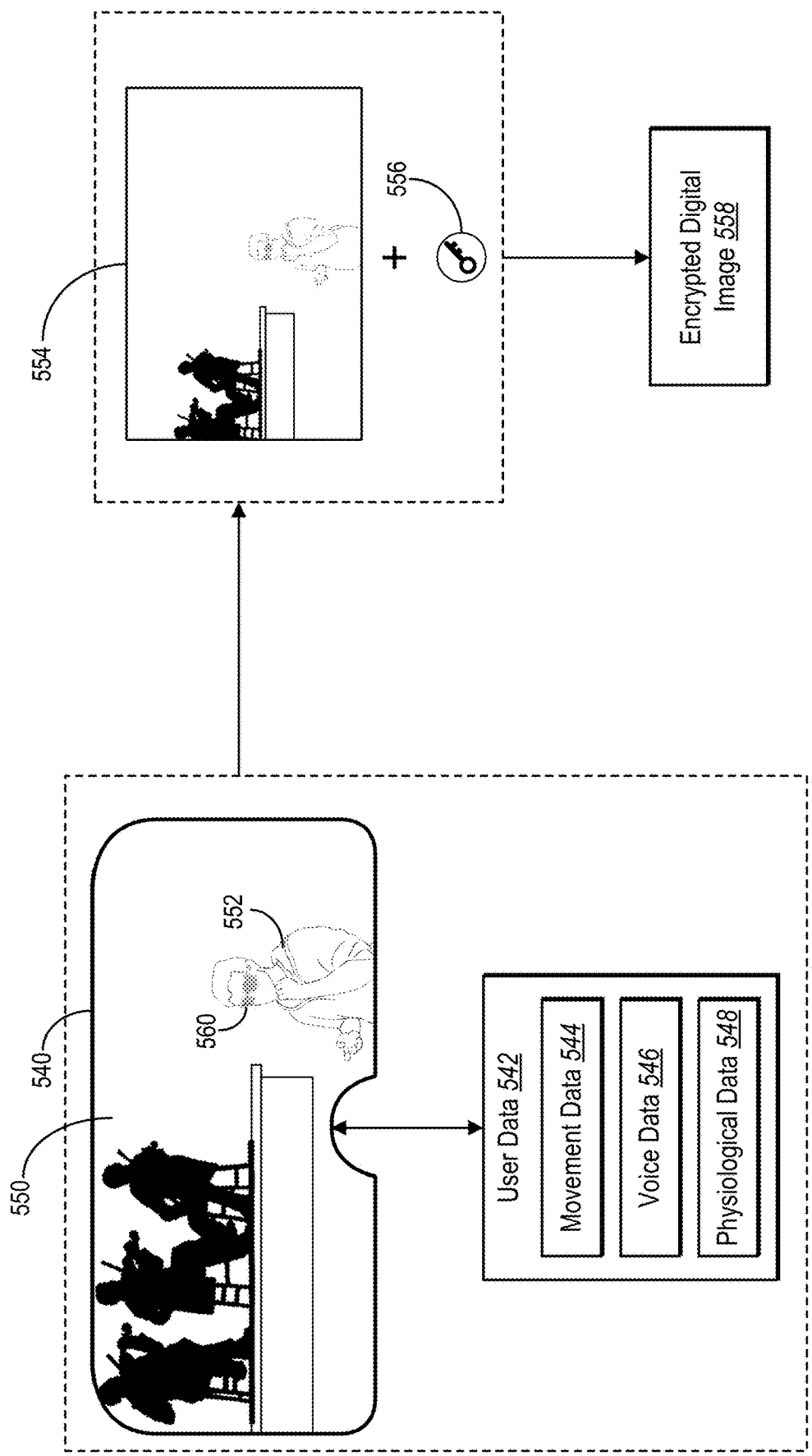

As mentioned above, while at an event, a computing device can detect an image-capture trigger. Based on detecting the image-capture trigger, the computing device can capture one or more digital images, some of which can include an image of another user attending the event. The available image-capture triggers can vary and, in some embodiments, can depend upon whether or not the image capture system 104 has received an opt-in indication from the user (i.e., has provided an image-capture indication to the computing device). FIGS. 5A-5C each illustrate a block diagram of a computing device capturing a digital image of a user at an event based on detecting an image-capture trigger in accordance with one or more embodiments.

FIG. 5A illustrates a block diagram of a computing device 502 detecting an image-capture trigger based on a user being positioned within a point of view 504 for capturing digital images in accordance with one or more embodiments. Indeed, as the computing device 502 (via its respective user) moves about and views (e.g., via a camera or other image sensor) a designated location, the user 506 may enter the point of view 504 of the computing device 502. In one or more embodiments, upon determining that the user 506 has entered into the point of view 504, the computing device 502 determines whether or not the user 506 has opted in to having digital images of the user 506 captured. For example, the computing device 502 can identify an image-capture indication provided by the image capture system 104, indicating that the user 506 has opted in.

As mentioned above, in one or more embodiments, the computing device 502 associates the user 506 with the corresponding image-capture indication based on the location updates provided by the computing device 508 of the user 506 via the image capture system 104. In other words, the computing device 502 can utilize the location updates provided by the computing device 508 to determine the identity of the user 506 and further determine whether the user 506 has opted in. For example, upon detecting that the user 506 has entered the point of view 504, the computing device 502 can analyze the most recent location updates for the users at the event. The computing device 502 can identify the user 506 based on those location updates (e.g., where a location update references a user being at the same location as the user 506). In some embodiments, the computing device 502 receives a communication from the computing device 508 of the user 506 (e.g., via a peer-to-peer connection) that provides the identification of the user 506. In still further embodiments, the computing device 502 utilizes facial recognition to determine the identity of the user 506 (e.g., based on one or more images of the user 506 on a social networking platform).

In one or more embodiments, in addition to determining whether the user 506 is within the point of view 504 (i.e., is within frame for capturing a digital image), the computing device 502 can determine whether the user 506 is in range for capturing a digital image. In other words, the computing device 502 can determine whether the user 506 is close enough so that the user 506 will be recognizable in the resulting digital image.

As shown in FIG. 5A, based on detecting the image-capture trigger (i.e., detecting that the user 506 is in the point of view 504), the computing device 502 captures the digital image 510 of the user 506. As further shown, the computing device 502 can encrypt the digital image 510 using the user encryption code 512 (e.g., provided with the image-capture indication) corresponding to the user 506 to generate the encrypted digital image 514. For example, in one or more embodiments, the computing device 502 encrypts the digital image 510 at the image-sensor level, preventing the computing device 502 from storing or transmitting an unprotected digital image. In some embodiments, however, the image capture system 104 receives the digital image 510 from the computing device 502 and generates the encrypted digital image 514 using the user encryption code 512. The image capture system 104 can provide the encrypted digital image 514 for access by the computing device 508 of the user 506.

As previously mentioned, in one or more embodiments, the user encryption code 512 includes a public encryption key corresponding to the user 506. Indeed, the public encryption key can be part of a public-private key pair corresponding to the user 506 where the public and private encryption keys have a relation to one another (e.g., a mathematical relation). The computing device 502 (or the image capture system 104) can encrypt the digital image 510 using the public encryption key. The computing device 508 for the user 506 can then access the digital image 510 using the corresponding private encryption key. For example, the computing device 508 for the user 506 can provide the private encryption key to the image capture system 104 along with a request to view the digital image 510. The image capture system 104 can then apply the private encryption key to the encrypted digital image 514 to provide the user 506 with access to the digital image 510.

FIG. 5B illustrates a block diagram of a computing device 520 detecting an image-capture trigger using a machine learning model 522 in accordance with one or more embodiments. For example, in one or more embodiments, the image capture system 104 trains the machine learning model 522 to determine when a point of view of a computing device provides a favorable view. In particular, the image capture system 104 can train the machine learning model 522 based on historically-favored-training images (e.g., previously-captured digital images that have obtained a desirable number of shares, likes, etc. on one or more social media platforms). Based upon an analysis of the historically-favored-training images, the image capture system 104 can modify parameters of the machine learning model 522. Thus, the image capture system 104 can improve the accuracy with which the machine learning model 522 detects when a point of view provides a favorable view through the training process.

As an example, in one or more embodiments, the image capture system 104 trains the machine learning model 522 to capture digital images based on the facial visibility of one or more people. In particular, the image capture system 104 can train the machine learning model 522, based on the historically-favored-training images, to capture digital images that show at least a minimum ratio of a person's face. For example, through the training process, the machine learning model 104 can determine that a favorable view provides visibility of at least a minimum ratio of a face that would be captured in the resulting digital image. Accordingly, the historically-favored-training images can include digital images providing views having a range of visible ratios of a person's face, and the image capture system 104 can use ground truths that include indications of whether those digital images obtained a desirable number of shares, likes, etc. on one or more social media platforms and/or ground truths indicating a ratio of a person's face. In one or more embodiments, the machine learning model 522 includes a convolutional neural network, such as the ImageNet network, for classifying the view of the computing device 520 (e.g., as favorable or unfavorable). In some embodiments, the machine learning model 522 can include the popularity-predictive machine learning model discussed below with regard to FIG. 9.

In one or more embodiments, the image capture system 104 provides the machine learning model 522 to the computing device 520. The computing device 520 can use the machine learning model 522 to detect that a point of view 524 of the computing device 520 provides a favorable view for capturing a digital image. As shown in FIG. 5B, the point of view 524 of the computing device 520 can include the user 526.

Based on detecting that, via the machine learning model 522, the point of view 524 provides a favorable view, the computing device 520 can capture a digital image 528 of the user 526. Similar to the discussion regarding FIG. 5A, the computing device 520 (or the image capture system 104) can encrypt the digital image 528 using the user encryption code 530 corresponding to the user 526. The computing device 520 can provide the encrypted digital image 532 for access by the computing device 534 of the user 526.

As suggested above, the computing device 520 can use the machine learning model 522 to generally detect when a point of view provides a favorable view, whether or not a user is within the view. In such a case, the computing device 520 can capture a digital image that happens to include the user 526 (i.e., the user 526 just happened to be in the point of view at the time the digital image was capture. and the computing device 520 did not capture the digital image with the purpose of including the user 526).

FIG. 5C illustrates a block diagram of a computing device 540 detecting an image-capture trigger based on user data in accordance with one or more embodiments. As shown in FIG. 5C, the computing device 540 monitors or receives user data 542 corresponding to a user of the computing device 540. For example, in one or more embodiments, the computing device 540 receives the user data 542 from a fitness tracker worn by the user of the computing device 540. In some embodiments, however, the computing device 540 includes capabilities for obtaining the user data 542 by monitoring the user directly.

In one or more embodiments, based on the user data 542, the computing device 540 determines that the point of view 550 of the computing device 540 provides a favorable view for capturing a digital image (e.g., detects an image-capture trigger). For example, based on the user data 542, the computing device 540 can determine that the user is in a heightened sense of awareness and/or engaged in activity.

As shown in FIG. 5C, the user data 542 includes movement data 544 corresponding to the user of the computing device 540. The movement data 544 can indicate whether the user of the computing device 540 is engaged in activity (e.g., whether the user is moving and how fast the user is moving). For example, the movement data 544 can provide a movement indication that a user of the computing device 540 is moving at an accelerated movement or a speed above an image-capture threshold. In one or more embodiments, the computing device 540 uses an inertial measurement unit (IMU) and/or other sensor inputs to obtain the movement data 544. For example, the computing device 540 can determine that sensor inputs are capturing fast or unusual data.

As further shown in FIG. 5C, the user data 542 includes voice data 546. In one or more embodiments, the voice data 546 provides a voice analysis of the user of the computing device 540. In one or more embodiments, the voice data 546 also provides a voice analysis of other users within a detectable range of the computing device 540. Based on the voice analysis, the computing device 540 can detect one or more voice cues indicative that the point of view 550 of the computing device 540 may provide a favorable view for capturing a digital image. For example, based on the voice data 546, the computing device 540 can determine a tone of voice of the user (or another user) and/or whether the user (or another user) is stressed, laughing, excited, etc., which can correspond to an opportunity to capture a desired digital image. In one or more embodiments, the computing device 540 employs a trained machine learning model to determine when the voice data 546 provides one or more voice cues indicative of a favorable view.

Additionally, as shown in FIG. 5C, the user data 542 includes physiological data 548. In one or more embodiments, the physiological data 548 provides one or more physiological analyses of the user of the computing device 540. For example, the physiological data 548 can provide a heartbeat analysis, a blood pressure analysis, a brainwave analysis, etc. Based on the one or more physiological analyses, the computing device 540 can detect one or more physiological cues indicative of activity occurring within a detectable range of the user (e.g., whether the user is directly involved in the activity or whether the activity is occurring close enough to the user to capture a digital image). For example, upon determining that the heartbeat of the user is elevated, the computing device 540 can determine that activity is occurring.

As mentioned, based on the user data 542, the computing device 540 can detect an image-capture trigger. In particular, the computing device 540 can detect an image-capture trigger based on detecting a movement indication, one or more voice cues, and/or one or more physiological cues. Based on detecting at least one of the aforementioned, the computing device 540 can capture a digital image 554 of the user 552. Similar to the discussion regarding FIG. 5B, the user 552 can be included in the digital image 554 even though the computing device 540 did not capture the digital image 554 with the purpose of including the user 552. Additionally, similar to the discussion regarding FIGS. 5A-5B, the computing device 540 (or the image capture system 104) can encrypt the digital image 554 utilizing the user encryption code 556 corresponding to the user 552. The computing device 540 can provide the encrypted digital image 558 for access by the computing device 560 of the user 552.

Though not shown in FIGS. 5A-5C, in one or more embodiments, a computing device can detect an image-capture trigger using facial recognition capabilities. Indeed, in one or more embodiments, a computing device can implement a model trained to recognize one or more individuals (e.g., friends or family members associated with the user of the computing device). Accordingly, the computing device can detect an image-capture trigger by detecting at least one of the individuals. Upon detecting the at least one individual, the computing device can capture a digital image.

By enabling computing devices to capture a digital image of a user attending an event based on detecting an image-capture trigger, the image capture system 104 can operate more flexibly than conventional systems. Indeed, the image capture system 104 can operate without requiring that a user of a computing device receive manual user input to capture a digital image of a user. Further, because a computing device can capture a digital image based on detecting that a user is in view, using a machine learning model, or based on user data, the computing device can capture the digital image without a user's express knowledge and on the basis that the resulting digital image will be favorable. Thus, the image capture system 104 can enable computing devices to more flexibly capture natural, candid images of a user (i.e., without requiring the user to request and/or pose for the image).

Figure 7:
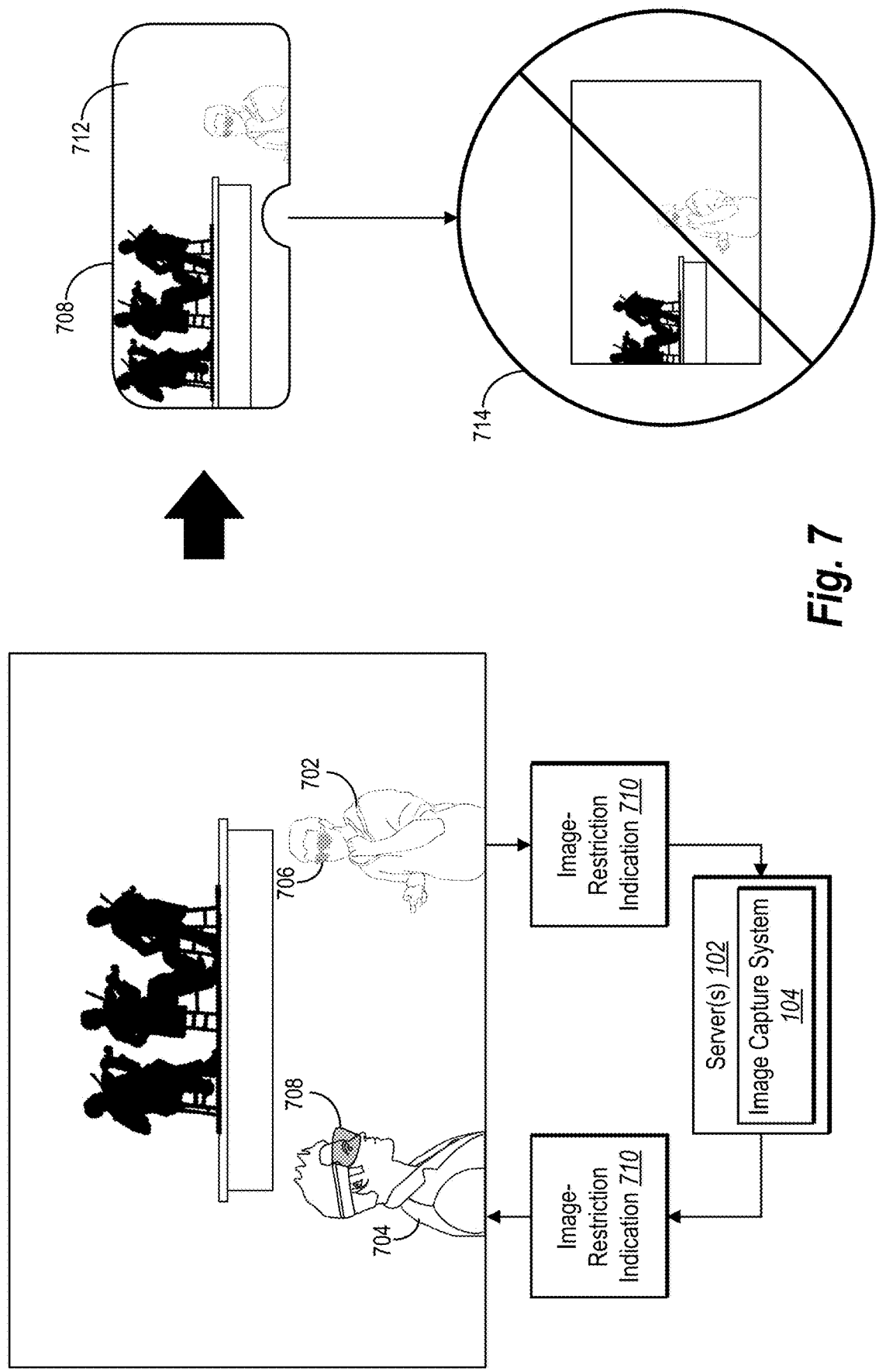
FIG. 7 illustrates a block diagram of providing an image-restriction indication corresponding to a user at an event in accordance with one or more embodiments.

As mentioned above, in one or more embodiments, the image capture system 104 enables a user to expressly select one or more privacy controls corresponding to capturing digital images of the user while at an event. As mentioned above, the image capture system 104 can receive an opt-out indication indicating that the user does not wish to have digital images of the user captured during the event. However, in some embodiments, a computing device may still capture a digital image of the user (e.g., based on a machine learning model indicating that the point of view of the computing device provides a favorable view). Thus, in one or more embodiments, the image capture system 104 provides controls through which a user can request that computing devices at an event actively operate to obscure or exclude an image of the user from captured digital images. FIGS. 6-7 illustrate block diagrams of the image capture system 104 utilizing additional options for providing privacy to a user at an event.

FIG. 6 illustrates a block diagram of the image capture system 104 providing a censorship request corresponding to a user at an event in accordance with one or more embodiments. Indeed, as shown in FIG. 6, the image capture system 104 receives, from a first computing device 606 of a first user 602, a censorship request 610 to censor digital images captured at the event from including an image of the first user 602. The image capture system 104 can transmit the censorship request 610 to a second computing device 608 of a second user 604.

Based on receiving the censorship request 610, the second computing device 608 can determine whether at least one digital image of the one or more digital images captured by the second computing device 608 during the event includes an image of the first user 602. Upon determining that at least one of the digital images includes an image of the first user 602, the second computing device 608 can modify the at least one digital image to censor the image of the first user 602 based on the censorship request 610 (as shown by the modified digital image 612).

In one or more embodiments, the second computing device 608 modifies a digital image to censor an image of the first user 602 by blurring the image of the first user 602 within the digital image. In some embodiments, the second computing device 608 modifies the digital image by replacing the image of the first user 602 within the digital image (e.g., with an image of another user, an object, background image, etc.). In still further embodiments, the second computing device 608 modifies the digital image by removing the image of the first user 602.

FIG. 7 illustrates a block diagram of the image capture system 104 providing an image-restriction indication corresponding to a user at an event in accordance with one or more embodiments. Indeed, as shown in FIG. 7, the image capture system 104 receives, from a first computing device 706 of a first user 702, an image-restriction indication 710 to avoid capturing digital images including an image of the first user 702. The image capture system 104 can transmit the image-restriction indication 710 to a second computing device 708 of a second user 704.

Based on receiving the image-restriction indication 710, the second computing device 708 can actively avoid capturing a digital image that includes an image of the first user 702. For example, the second computing device 708 can detect an image-capture trigger for capturing a digital image. The second computing device 708 can determine that the first user 702 is within a point of view 712 for capturing the digital image. Based on the image-restriction indication 710, the second computing device 708 can determine to not capture the digital image (as indicated by the prohibition element 714). Thus, when detecting image-capture triggers during an event, the second computing device 708 can capture one or more digital images without capturing a digital image of the first user 702 to comply with the image-restriction indication 710.

By providing the aforementioned privacy controls, the image capture system 104 operates more securely than conventional systems. Indeed, the image capture system 104 can operate to maintain a level of anonymity desired by a particular user attending an event. In particular, by preventing computing devices from actively capturing digital images of a user when in view, or by instructing the computing devices to actively avoid including an image of the user in digital images, the image capture system 104 secures the privacy of a user when desired.

Figure 8:
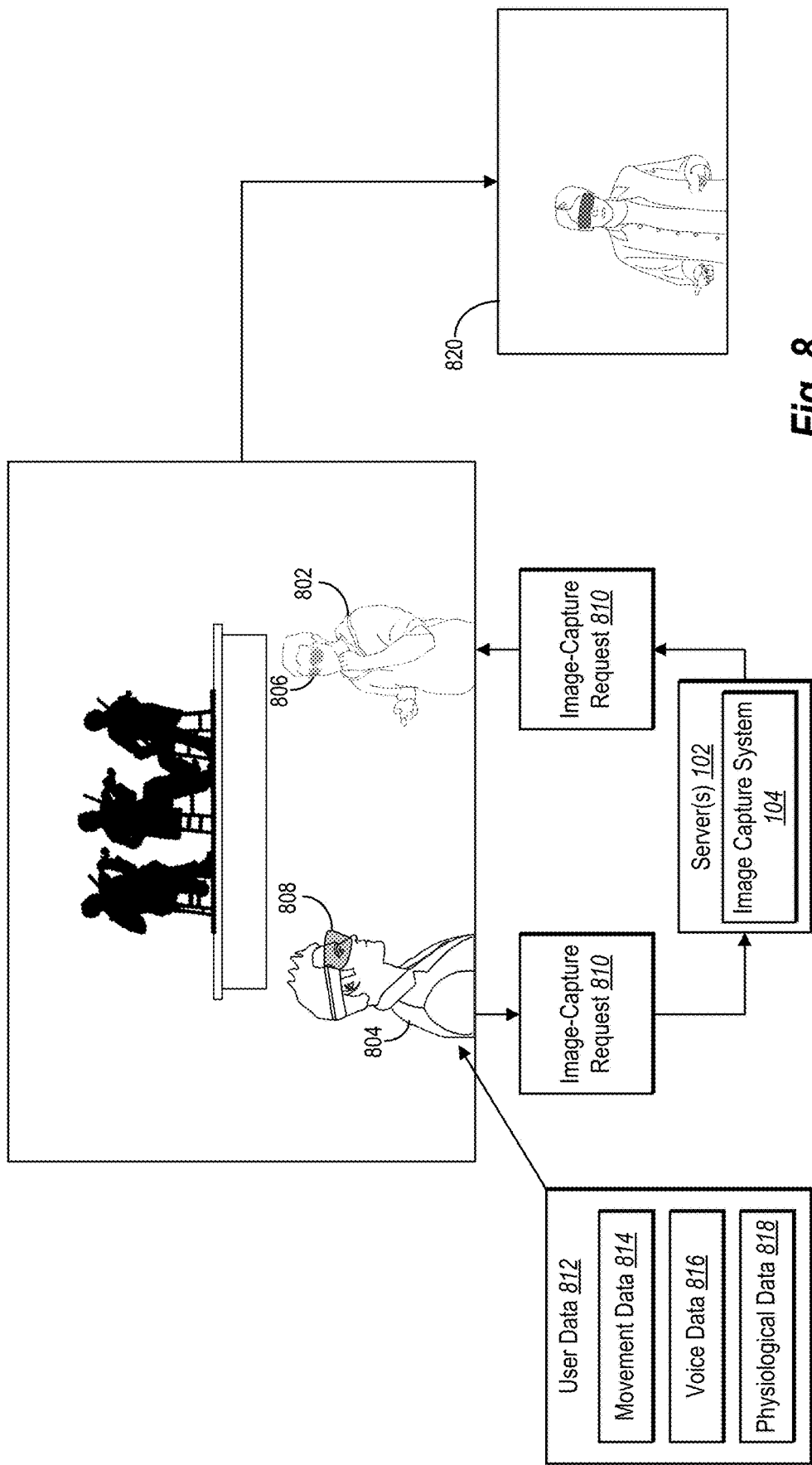
FIG. 8 illustrates a block diagram of providing an image-capture request corresponding to a user at an event in accordance with one or more embodiments.

In one or more embodiments, the image capture system 104 enables users attending an event to submit an express request to have a computing device capture a digital image of the user. FIG. 8 illustrates a block diagram of the image capture system 104 providing an image-capture request corresponding to a user at an event in accordance with one or more embodiments. Indeed, as shown in FIG. 8, the image captures system 104 receives, from a second computing device 808 of a second user 804, an image-capture request 810 to capture a digital image of the second user 804. The image capture system 104 can transmit the image-capture request 810 to a first computing device 806 of a first user 802.

In one or more embodiments, the second computing device 808 submits the image-capture request 810 based on detecting an image-capture trigger for capturing a digital image of the second user 804. For example, the second computing device 808 can detect an image-capture trigger based on user data 812. As shown in FIG. 8, the user data 812 includes movement data 814, voice data 816, and physiological data 818. Similar to the user data 542 of FIG. 5C, the movement data 814 can provide a movement indication associated with the second user 804, the voice data 816 can provide a voice analysis associated with the second user 804 (or other nearby users), and the physiological data 818 can provide a physiological analysis (e.g., a heartbeat analysis) of the second user 804.

In one or more embodiments, the image capture system 104 provides the image-capture request 810 to all other computing devices attending the event. In some embodiments, the image capture system 104 provides the image-capture request 810 to computing devices near the second user 804, such as the first computing device 806. In some embodiments, the image capture system 104 determines which computing devices currently have the second user 804 in view for capturing a digital image and then transmits the image-capture request 810 to those digital images.

Based on receiving the image-capture request 810, the first computing device 806 can capture a digital image 820 of the second user 804. For example, the first computing device 806 can determine that the second user 804 is in view for capturing a digital image and then capture the digital image 820 based on the image-capture request 810 accordingly. In one or more embodiments, the first computing device 806 (or the image capture system 104) encrypts the digital image 820 using a user encryption code corresponding to the second user 804. Further, the first computing device 806 can provide the digital image 820 for access by the second computing device 808.

By enabling computing devices to submit image-capture requests, the image capture system 104 can improve upon the flexibility issues experienced by many conventional systems. Indeed, by enabling a computing device to detect when there is an opportunity to capture a digital image of its respective owner and then submit a request accordingly, the image capture system 104 facilitates the capturing of desirable digital images without user input. Indeed, a user does not have to manually submit a request and then pose or perform an action to capture the desired digital image. Accordingly, the image capture system 104 can flexibly provide candid digital images to a user.

Figure 9:
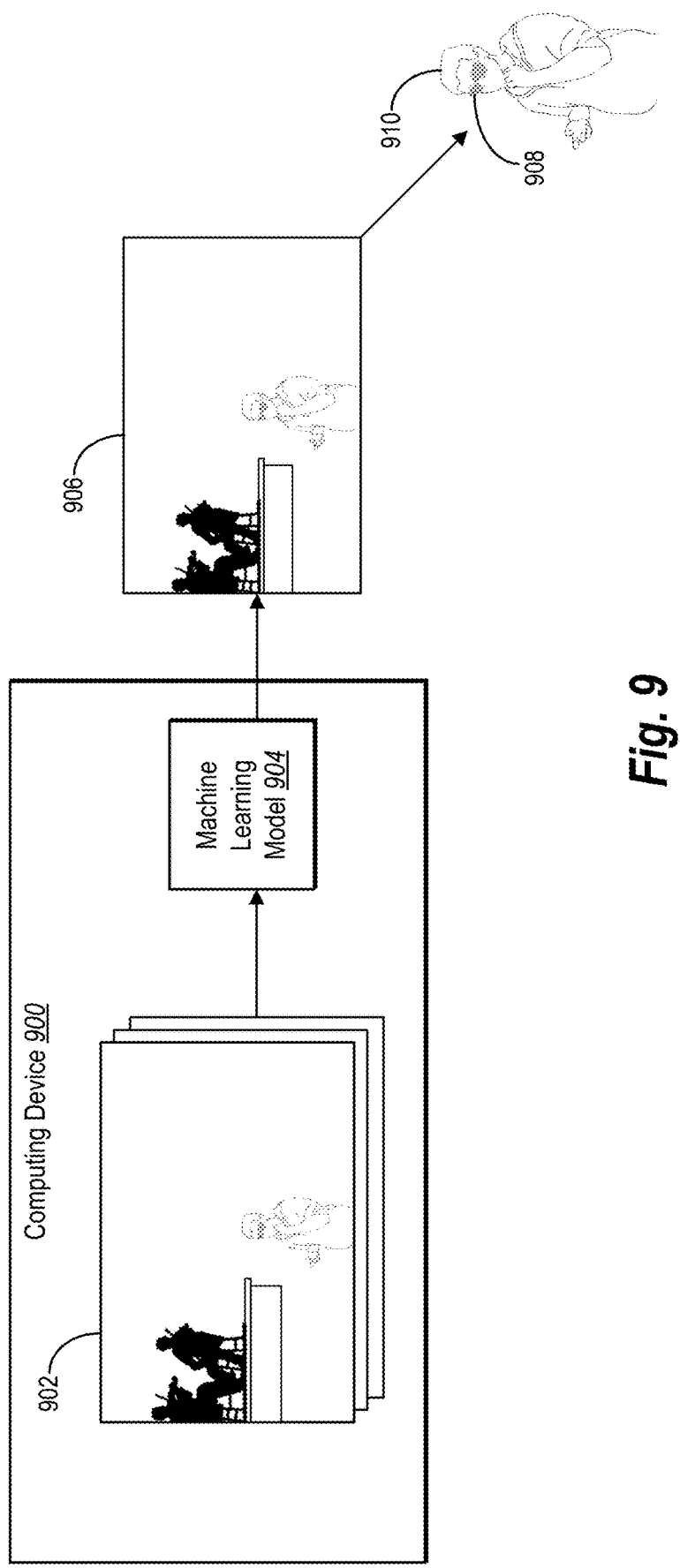
FIG. 9 illustrates a block diagram of using a machine learning model to select a subset of digital images from a collection of digital images in accordance with one or more embodiments.

As previously mentioned, in one or more embodiments, the image capture system 104 facilitates the selection of desirable digital images captured of a particular user at an event. In particular, the image capture system 104 can utilize a machine learning model to select one or more digital images from a collection of captured digital images of a user where the selected digital images provide a favorable image. FIG. 9 illustrates a block diagram of using a machine learning model to select a subset of digital images from a collection of digital images in accordance with one or more embodiments.

As shown in FIG. 9, a computing device 900 has a collection of digital images 902 that include the image of a user 910. As mentioned, in one or more embodiments, the computing device 900 includes a server device (e.g., the server(s) 102) implementing the image capture system 104, and the collection of digital images 902 includes digital images of the user 910 captured by the computing devices of other users at the event. In some embodiments, however, the computing device 900 includes the computing device that captured the digital images in the collection of digital images 902. Indeed, in one or more embodiments, a computing device captures multiple digital images of the user and then utilizes the machine learning model 904 (e.g., a popularity-predictive machine learning model) to determine which digital images to provide for access by a computing device 908 of the user 910.

In one or more embodiments, the image capture system 104 trains the machine learning model 904 to identify digital images comprising a favorable image based on historically-favored-training images. To illustrate, the image capture system 104 can provide a collection of training images to the machine learning model 904 and utilize the machine learning model 904 to predict which of the training images include the most favorable image (e.g., had obtained the most shares, likes, etc. across one or more social media platforms). The image capture system 104 can compare the prediction to a ground truth image (i.e., the image from the collection of training images that includes the most favorable image) using a loss function. Based on the determined loss, the image capture system 104 can modify parameters of the machine learning model 904 (e.g., via back propagation). Consequently, with each iteration of training, the image capture system 104 can gradually increase the accuracy with which the machine learning model 904 identifies the most favorable image from a collection of digital images. In one or more embodiments, the image capture system 104 trains the machine learning model 904 to identify multiple digital images that include the most favorable images. In some such cases, the machine learning model 904 includes a convolutional neural network, such as the ImageNet network, for classifying images as favorable or unfavorable for a social networking platform. Additionally, or alternatively, in one or more embodiments, the machine learning model 904 includes the machine learning model 522 described above with reference to FIG. 5B.

As shown in FIG. 9, the computing device 900 (whether a server or the computing device that captured the collection of digital images 902) uses the machine learning model 904 to select a subset of digital images 906 (i.e., one or more digital images—though shown as one digital image here) from the collection of digital images 902 where the digital images in the subset of digital images 906 include a favorable image. As shown in FIG. 9, the computing device 900 can provide the subset of digital images 906 for access by the computing device 908 of the user 910.

Figure 10:
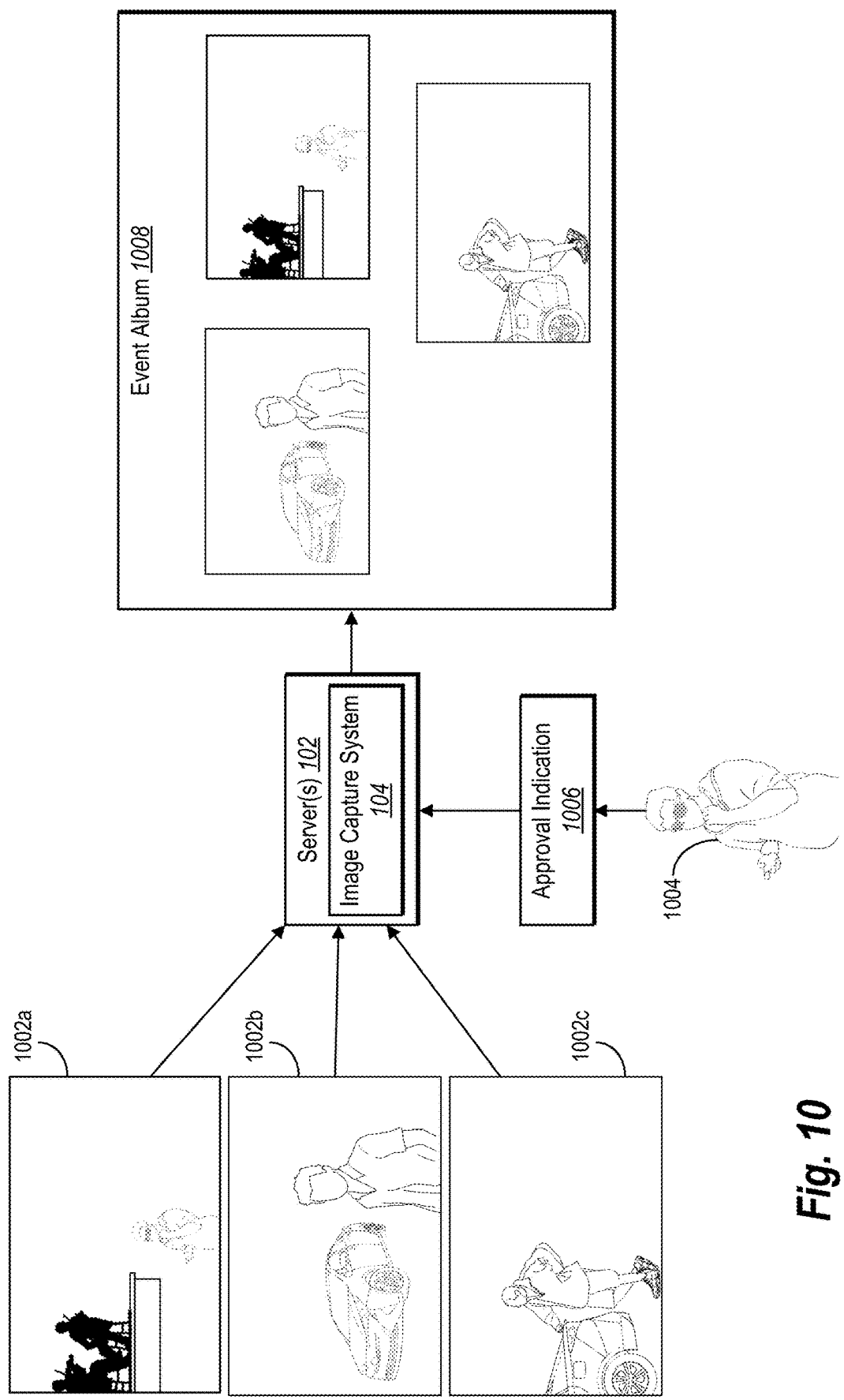
FIG. 10 illustrates a block diagram of generating an event album in accordance with one or more embodiments.

As mentioned above, in one or more embodiments, the image capture system 104 generates an event album comprising one or more digital images captured at an event. Indeed, the digital images included in the event album can include the images of various users attending the event. FIG. 10 illustrates a block diagram of the image capture system 104 generating an event album in accordance with one or more embodiments.

As shown in FIG. 10, the image capture system 104 can receive digital images 1002a-1002c captured by one or more computing devices at an event. The digital images 1002a-1002c can include the image of one or more users that attended the event. The image capture system 104 can generate an event album 1008 that includes one or more of the digital images 1002a-1002c from the event. In one or more embodiments, the image capture system 104 adds a digital image comprising an image of a particular user—such as the digital image 1002a comprising the image of the user 1004—to the event album 1008 upon receiving an approval indication 1006 from the user. By using an approval of a user captured in a digital image to add the digital image to the event album 1008, the image capture system 104 enables a user to have secure control over whether other users will be able to see the digital image.

In one or more embodiments, the image capture system 104 sends an album notification to a plurality of computing devices corresponding to the event, notifying the plurality of computing devices of the event album 1008. For example, the image capture system 104 can send the album notification to the computing devices of all users who attended event, to a subset of computing devices associated with users who indicated that they would like to receive notifications associated with the event, or to a subset of computing devices associated with users having an image captured by one of the digital images included in the event album 1008.

In one or more embodiments, the image capture system 104 provides the event album 1008 on a web page or social media page associated with the event. In some embodiments, the image capture system 104 provides the event album 1008 on a web page or social media page associated with one or more users that attended the event (e.g., those users providing an approval indication to be included in the event album 1008). In still further embodiments, the image capture system 104 provides the event album for download.

Figure 11:
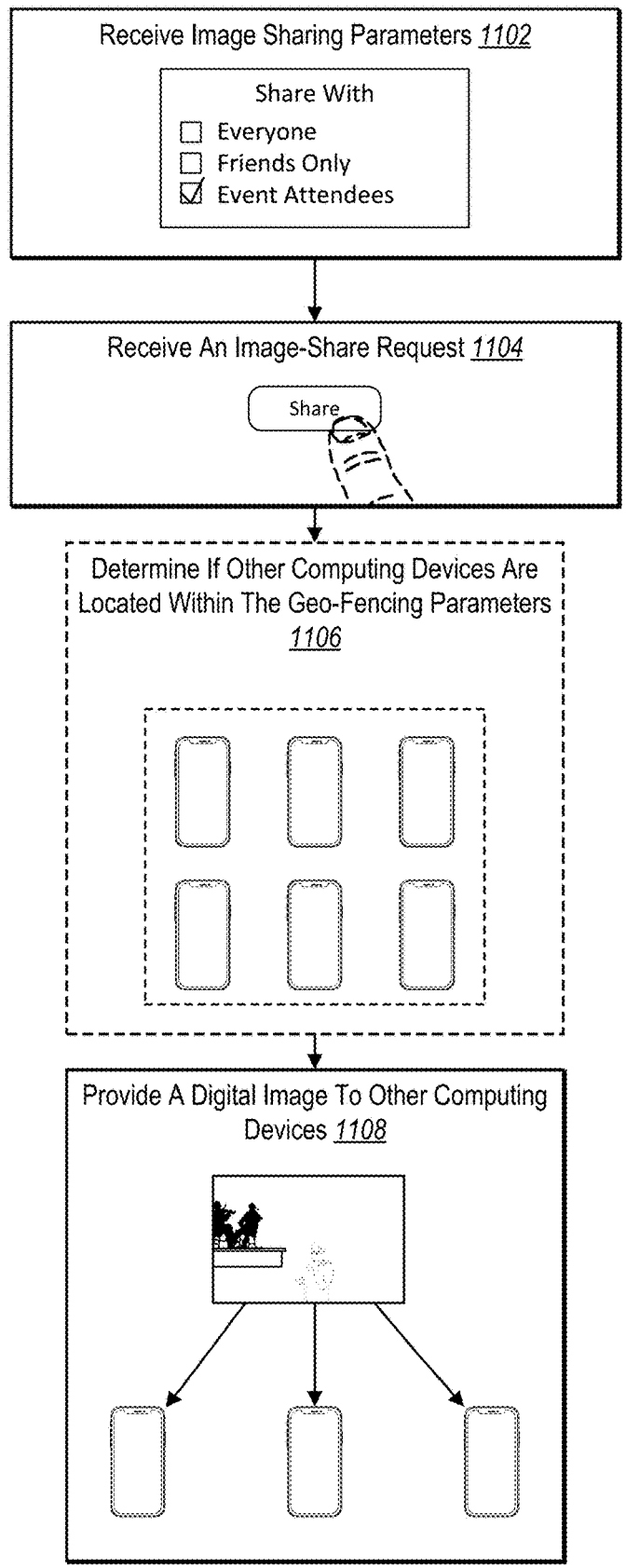
FIG. 11 illustrates an overview of an image capture system sharing digital images of a user based on sharing parameters in accordance with one or more embodiments.

In one or more embodiments, the image capture system 104 enables a user to share digital images of the user captured during an event. For example, FIG. 11 illustrates an overview of a sequence of acts that the image capture system 104 performs for sharing one or more digital images of a user with one or more other users in accordance with one or more embodiments. Though FIG. 11 discloses the acts being performed by the image capture system 104, one or more of the acts can be performed by one of various other components (e.g., the computing device of the user captured in the digital image(s) to be shared).

For instance, as shown in FIG. 11, the image capture system 104 performs an act 1102 of receiving image sharing parameters. In particular, the image capture system 104 can receive sharing parameters via a computing device associated with the user of the digital image(s) to be shared. For example, the image capture system 104 can receive a selection of digital image(s) to be shared and/or a selection of other users with whom to share the digital image(s).

In one or more embodiments, the sharing parameters can include one or more geo-fencing parameters. For example, the image capture system 104 can provide, to the client device of the user, a map interface that allows the user to manually select one or more geo-fencing parameters corresponding to a desired area. In some embodiments, the image capture system 104 presents, to the client device, geo-fencing parameters corresponding to pre-determined locations. For example, the image capture system 104 can present geo-fencing parameters indicating (e.g., corresponding to) a designated location (i.e., the location of the event).

Furthermore, as illustrated in FIG. 11, the image capture system 104 performs an act 1104 of receiving an image-share request. In one or more embodiments, the image capture system 104 receives the image share request as a manual user input (e.g., a button select) via the computing device of the user. In some embodiments, the image-share request is inherent to a selection of one or more digital images for sharing and/or a selection of users with whom to share the digital image(s). In still further embodiments, the image capture system 104 receives the image-share request before the time of sharing. For example, the user of the digital image(s) can preestablish sharing parameters and an image-share request before digital images are captured of the user.

As further shown in FIG. 11, the image capture system 104 performs an optional act 1106 of determining if other computing devices are located within the geo-fencing parameters. In particular, where the sharing parameters include one or more geo-fencing parameters indicating the designated location, the image capture system 104 can identify the computing devices within the designated area. In one or more embodiments, the image capture system 104 determines that a computing device satisfies the geo-fencing parameters even if the computing device is not within the designated area at the time of sharing, as long as the user of the computing device attended the event.

In some embodiments, the geo-fencing parameters are associated with a pre-determined subset of users. For example, a user attending the event can preestablish a group of users (e.g., friends only, friends and family, etc.) with whom the image capture system 104 can share digital images of the user captured while the user was within the designated area. Thus, the optional act 1106 can include identifying the computing devices that are associated with the preestablished group of users corresponding to the geo-fencing parameters.

Additionally, as shown in FIG. 11, the image capture system 104 performs the act 1108 of providing a digital image to other computing devices. In particular, the image capture system 104 can provide access to the digital image(s) to the identified computing devices. In one or more embodiments, the image capture system 104 provides the digital image(s) by providing a link to the digital images (e.g., via email or text), providing the digital image(s) itself, or posting the digital image(s) to a social networking account associated with the users of the identified computing devices. In some embodiments, the image capture system 104 can further provide a notification to the identified computing devices indicating that the digital image(s) are available for access.

Figure 12:
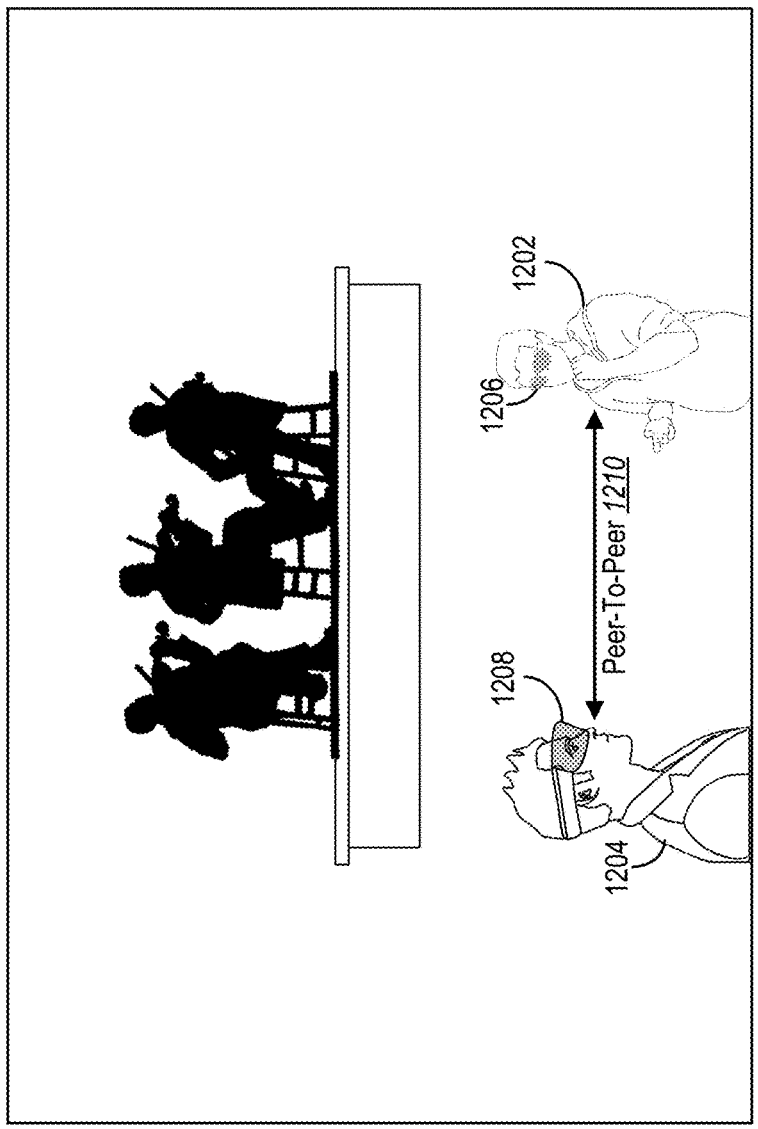
FIG. 12 illustrates a diagram of computing devices communicating via a peer-to-peer connection in accordance with one or more embodiments.

As mentioned above, in one or more embodiments, rather than using a server implementing the image capture system 104 to facilitate the capture and transmission of computing devices, the computing devices at the event can communicate via a peer-to-peer connection. Indeed, the computing devices at the event can communicate either entirely or, at least, partially via the peer-to-peer connection. FIG. 12 illustrates a diagram of computing devices communicating via a peer-to-peer connection in accordance with one or more embodiments.

As shown in FIG. 12, a first computing device 1206 of a first user 1202 communicates with a second computing device 1208 of a second user 1204 via the peer-to-peer connection 1210. For example, the first computing device 1206 can establish the peer-to-peer connection 1210 with the second computing device 1208 based on the second computing device 1208 being within range of a signal of the first computing device 1206 (e.g., a short-range wireless signal, such as a Bluetooth low energy signal).

Via the peer-to-peer connection 1210, the first computing device 1206 can provide the second computing device 1208 directly with location updates regarding the current location of the first user 1202. In one or more embodiments, the first computing device 1206 further provides the user encryption code corresponding to the first user 1202 to the second computing device 1208 via the peer-to-peer connection 1210. In one or more embodiments, the second computing device 1208 determines that the first user 1202 has opted in to having digital images of the first user 1202 captured based on receiving the location updates and/or the user encryption code.

In addition to, or as an alternative to, the location updates and the encryption key, the first computing device 1206 can provide other signals or requests to the second computing device 1208 via the peer-to-peer connection 1210. For example, the first computing device 1206 can provide censorship requests or image-restriction indications via the peer-to-peer connection 1210. Additionally, the second computing device 1208 can provide signals—such as image-capture requests—to the first computing devices 1216 via the peer-to-peer connection 1210.

Upon capturing a digital image of the first user 1202, the second computing device 1208 can encrypt the digital image and provide the encrypted digital image to the first computing device 1206 via the peer-to-peer connection 1210. In one or more embodiments, the second computing device 1208 streams the digital image to the first computing device 1206 so that the digital image is not stored in memory of the second computing device 1208. In particular, where the second computing device 1208 captures a video feed of the first user 1202, the second computing device 1208 can stream the video feed to the first computing device 1206 live. In some embodiments, however, the second computing device 1204 stores the digital image temporarily, until it can transmit the digital image to the first computing device 1206.

Figure 13:
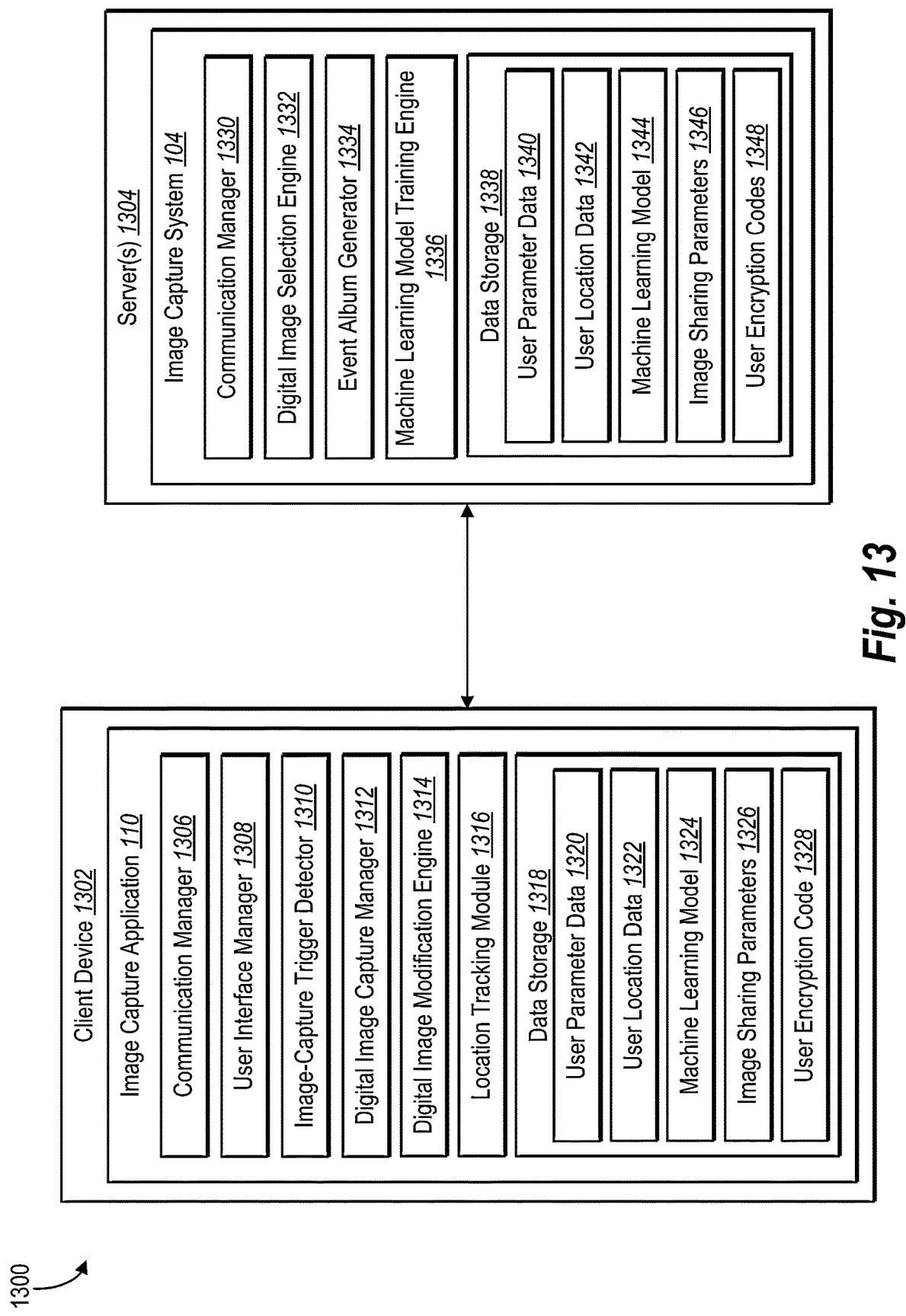
FIG. 13 illustrates an example schematic diagram of a system in accordance with one or more embodiments.

Turning now to FIG. 13, additional detail will be provided regarding components and capabilities of one embodiment of the present invention comprising the environment 100. In particular, FIG. 13 illustrates an embodiment of an exemplary system 1300. As shown, the system 1300 may include, but is not limited to, a client device 1302 and a server(s) 1304. In particular, FIG. 13 illustrates the image capture application 110 implemented by the client device 1302 and the image capture system 104 implemented by the server(s) 1304. Moreover, as shown, the client device 1302 includes, but is not limited to, a communication manager 1306, a user interface manager 1308, an image-capture trigger detector 1310, a digital image capture manager 1312, a digital image modification engine 1314, a location tracking module 1316, and data storage 1318 (which includes user parameter data 1320, user location data 1322, a machine learning model 1324, image sharing parameters 1326, and user encryption code 1328). Additionally, as shown in FIG. 13, the server(s) 1304 includes, but is not limited to, a communication manager 1330, a digital image selection engine 1332, an event album generator 1334, a machine learning model training engine 1336, and data storage 1338 (which includes user parameter data 1340, user location data 1342, machine learning model 1344, image sharing parameters 1346, and user encryption codes 1348). Though FIG. 13 illustrates each component of the system 1300 implemented by a particular device, the components can be implemented by the other device in some embodiments.

As just mentioned, and as illustrated by FIG. 13, the client device 1302 includes the communication manager 1306. In particular, the communication manager 1306 can transmit and/or receive communications from the server(s) 1304 or other computing devices. For example, the communication manager 1306 can transmit and/or receive location updates, opt-in indications, image-capture indications, censorship requests, image-restriction indications, image-capture requests, approval indications, and digital images. Further, the communication manager 1306 can establish a peer-to-peer connection with another computing device when available.

As shown in FIG. 13, the client device 1302 also includes the user interface manager 1308. Indeed, the user interface manager 1308 can provide display elements and receive user input via a user interface displayed on the client device 1302. Where the client device 1302 includes a head-mounted-display device providing an augmented reality display, the user interface manager 1308 can provide augmented reality display elements and receive inputs via the head-mounted-display device.

Further, as shown in FIG. 13, the client device 1302 includes the image-capture trigger detector 1310. In particular, the image-capture trigger detector 1310 can detect various image-capture triggers for capturing a digital image. For example, the image-capture trigger detector 1310 can detect when a user who has opted in to having digital images captured is in frame for a digital image, when a point of view of the client device 1302 provides a favorable view using a machine learning model, when the user of the client device 1302 is moving, and various voice cues and/or physiological cues based on analyses of the user of the client device 1302 or other users within a detectable range.

As shown in FIG. 13, the client device 1302 further includes the digital image capture manager 1312. In particular, the digital image capture manager 1312 can capture a digital image (or a series of digital images or a video) based on the image-capture trigger detector 1310 detecting an image-capture trigger. For example, the digital image capture manager 1312 can manage a camera of the client device 1302 for capturing a digital image.

As shown in FIG. 13, the client device 1302 also includes the digital image modification engine 1314. In particular, the digital image modification engine 1314 can modify a digital image of a user captured by the digital image capture manager 1312 based on one or more communications received by the communication manager 1306. For example, the digital image modification engine 1314 can modify a digital image of a user to blur, remove, or replace, the image of the user within a digital image based on receiving a censorship request.

Additionally, as shown in FIG. 13, the client device 1302 includes the location tracking module 1316. Indeed, the location tracking module 1316 can track a current location of the client device 1302. For example, the location tracking module 1316 can implement a GPS system or a SLAM system to track a location of the client device 1302. The location tracking module 1316 can provide the current location to the communication manager 1306 for transmission to the server(s) 1304 or other computing devices.

Further, as shown in FIG. 13, the client device 1302 includes data storage 1318. In particular, the data storage 1318 includes the user parameter data 1320, the user location data 1322, the machine learning model 1324, the image sharing parameters 1326, the and user encryption code 1328. The user parameter data 1320 can include data regarding registration of the user at an event, including whether the user has opted in, requested to have images censored, etc. The user location data 1322 can include the current location of the user. The user location data 1322 can also include the current location of other users at an event. The machine learning model 1324 can include a machine learning model trained by the machine learning model training engine 1336 of the server(s) 1304 and used by the image-capture trigger detector 1310 to detect when a point of view of the client device 1302 provides a favorable view. The image sharing parameters 1326 can include user settings for sharing digital images of the user captured at the event, such as one or more geo-fencing parameters. The user encryption code 1328 can include the user encryption code corresponding to the user of the client device 1302 (e.g., the public encryption key and corresponding private encryption key). The user encryption code 1328 can further include the user encryption codes of other users at an event as provided by the server(s) 1304 (e.g., via an image-capture indication).

Furthermore, as illustrated in FIG. 13, the server(s) 1304 include the communication manager 1330. Similar to the communication manager 1306, the communication manager 1330 can transmit and/or receive communications from other computing devices (e.g., the client device 1302). In some embodiments, however, the communication manager 1330 transmits and/or receives communications from all computing devices at an event. Further, the communication manager 1330 can provide notifications to computing devices regarding the accessibility of digital images, an event album, etc.

Additionally, as shown in FIG. 13, the server(s) 1304 include the digital image selection engine 1332. In particular, the digital image selection engine 1332 can select a subset of digital images of a user from a collection of digital images of the user that provide a favorable image. For example, the digital image selection engine 1332 can utilize a machine learning model trained by the machine learning model training engine 1336 to identify a subset of digital images that provide a favorable image.

As shown in FIG. 13, the server(s) 1304 also include the event album generator 1334. In particular, the event album generator 1334 can generate an event album that includes a plurality of digital images captured at an event. The event album generator 1334 can add a digital image of a particular user to the event album based on receiving an approval indication from that user.

As shown in FIG. 13, the server(s) 1304 further include the machine learning model training engine 1336. Indeed, the machine learning model training engine 1336 can train a machine learning model to detect when a point of view of a client device provides a favorable view. The server(s) 1304 can provide the trained machine learning model to the client device 1302 for use by the image-capture trigger detector 1310. The machine learning model training engine 1336 can also train a machine learning model to select a subset of digital images from a collection of digital images that provide a favorable image for use by the event album generator 1334.

Further, as shown in FIG. 13, the server(s) 1304 include data storage 1338. In particular, the data storage 1338 includes the user parameter data 1340, the user location data 1342, the machine learning model 1344, the image sharing parameters 1346, and the user encryption codes 1348. The user parameter data 1340 can include registration data, opt-in data, censorship requests, etc. for a plurality of users attending an event. The user location data 1342 can include the current location of a plurality of users attending the event. The machine learning model 1344 can store the machine learning models trained by the machine learning model training engine 1336. The image sharing parameters 1346 can include the image sharing parameters submitted by a plurality of client devices attending the event. The user encryption codes 1348 can include user encryption codes corresponding to a plurality of users attending the event.

Figure 14:
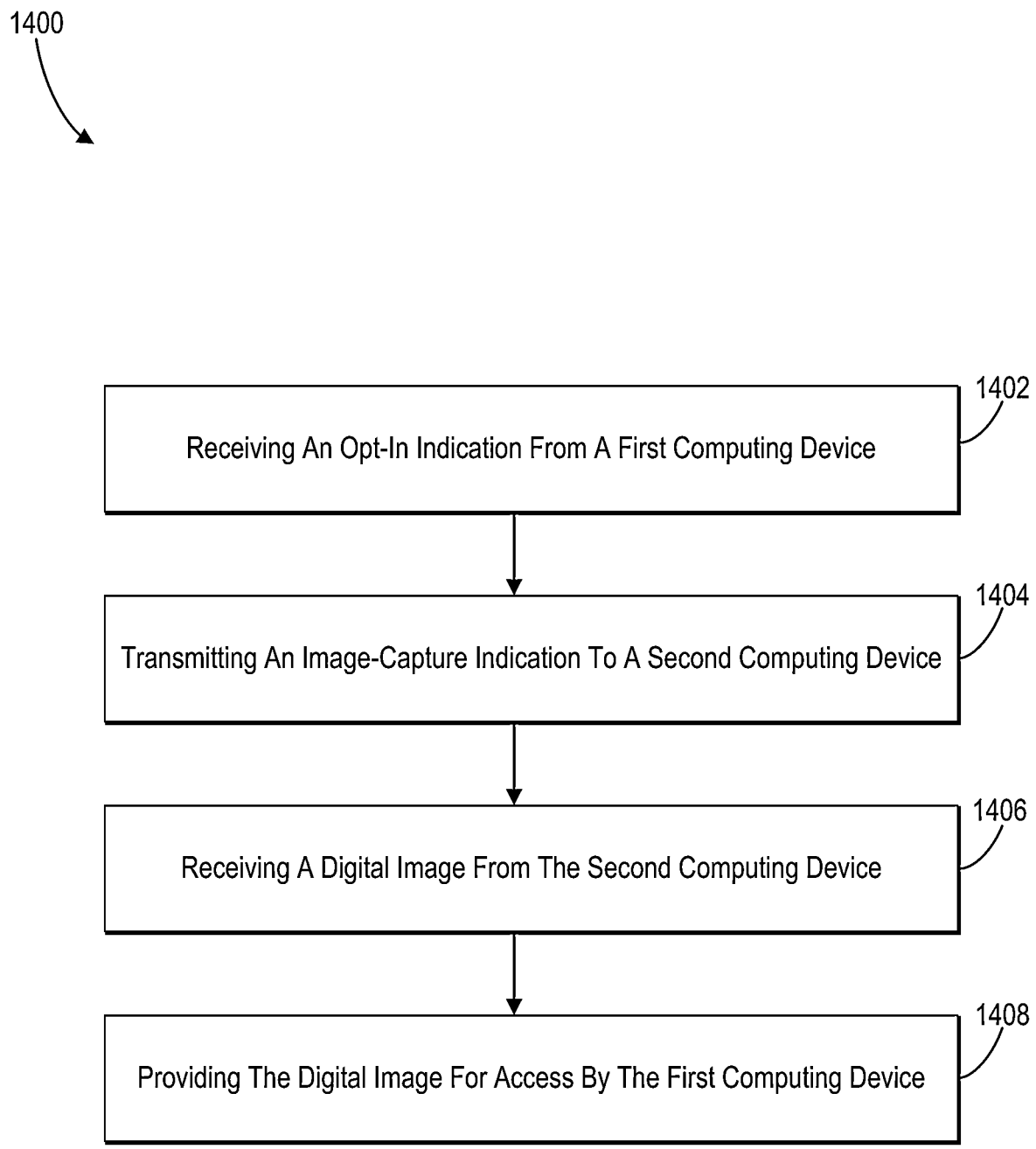
FIG. 14 illustrates a flowchart of a series of acts for capturing a digital image of a user of a computing device by another computing device at an event based on opt-in and image-capture indications in accordance with one or more embodiments.
Figure 15:
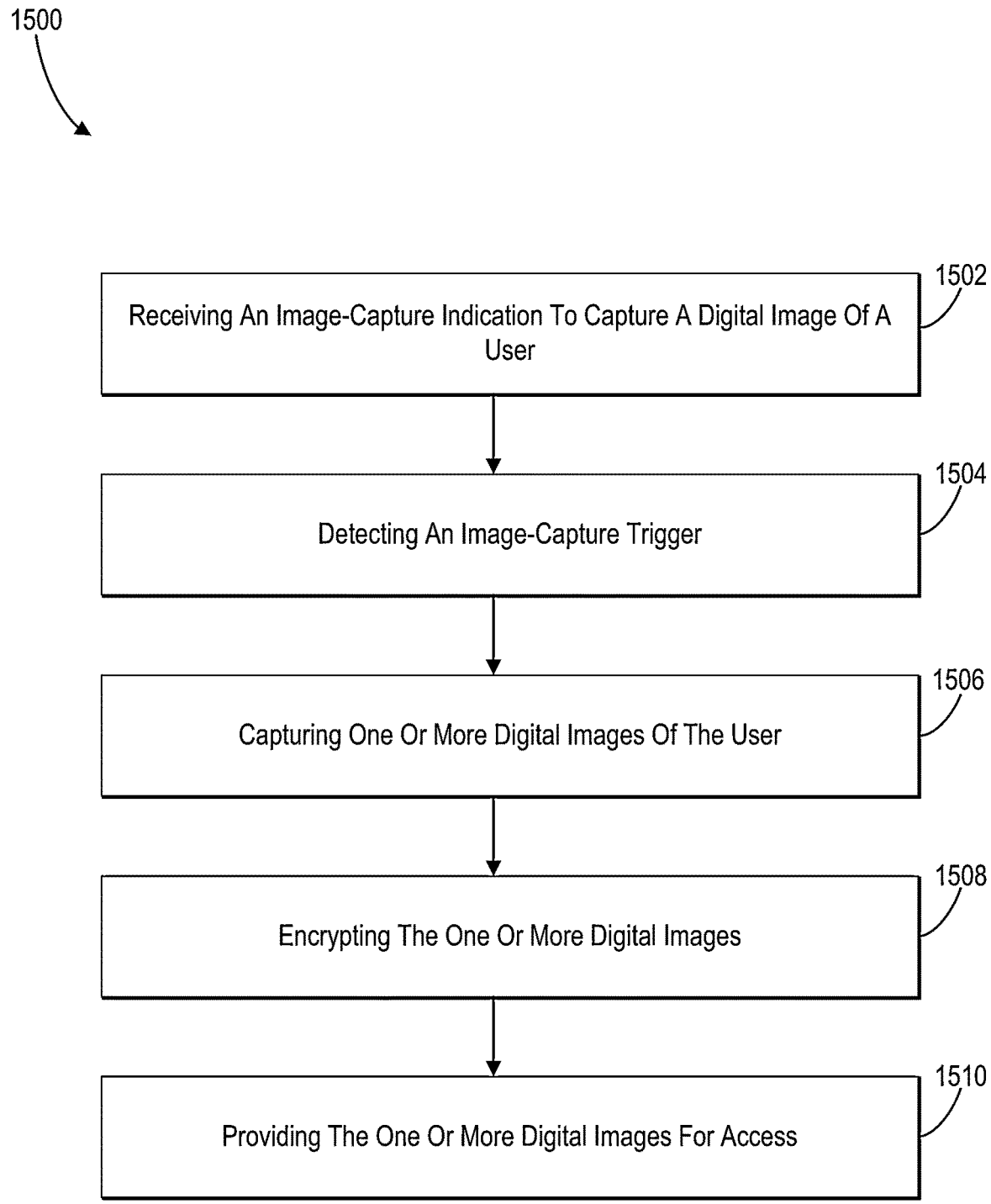
FIG. 15 illustrates a flowchart of a series of acts for capturing a digital image of a user in accordance with one or more embodiments.

FIGS. 1-13, the corresponding text, and the examples provide a number of different systems, methods, techniques, components, and/or devices of the image capture system 104 in accordance with one or more embodiments. In addition to the above description, one or more embodiments can also be described in terms of flowcharts comprising acts for accomplishing a particular result. For example, FIG. 14 and FIG. 15 illustrate flowcharts of example sequences of acts in accordance with one or more embodiments. In addition, each of the sequences of acts in FIG. 14 and FIG. 15 may be performed with more or fewer acts. Further, the acts may be performed in differing orders. Additionally, the acts described herein may be repeated or performed in parallel with one or another or parallel with different instances of the same or similar acts.

Each of the components 1306-1348 of the system 1300 can include software, hardware, or both. For example, the components 1306-1348 can include one or more instructions stored on a computer-readable storage medium and executable by processors of one or more computing devices, such as a client device or server device. When executed by the one or more processors, the computer-executable instructions of the system 1300 can cause the computing device(s) to perform the methods described herein. Alternatively, the components 1306-1348 can include hardware, such as a special-purpose processing device to perform a certain function or group of functions. Alternatively, the components 1306-1348 of the system 1300 can include a combination of computer-executable instructions and hardware.

Furthermore, the components 1306-1348 of the system 1300 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1306-1348 of the system 1300 may be implemented as a stand-alone application, such as a desktop or mobile application. Furthermore, the components 1306-1348 of the system 1300 may be implemented as one or more web-based applications hosted on a remote server. Alternatively, or additionally, the components 1306-1348 of the system 1300 may be implemented in a suite of mobile device applications or "apps."

While FIG. 14 and FIG. 15 each illustrate a series of acts according to particular embodiments, alternative embodiments may omit, add to, reorder, and/or modify any of the acts shown. The series of acts of FIG. 14 and FIG. 15 can each be performed as part of a method. Alternatively, a non-transitory computer-readable medium can comprise instructions that, when executed by at least one processor, cause a computing device (e.g., a client device and/or a server device) to perform the series of acts of FIG. 14 and/or FIG. 15. In still further embodiments, a system performs the acts of FIG. 14 and/or FIG. 15. For example, in one or more embodiments, a system includes at least one processor and at least one non-transitory computer-readable medium comprising instructions that, when executed by the at least one processor, cause the system to perform the acts of FIG. 14 and/or FIG. 15.

To illustrate, FIG. 14 shows a flowchart of a series of acts 1400 for capturing a digital image of a user of a computing device by another computing device based on opt-in and image-capture indications in accordance with one or more embodiments. As shown, the series of acts 1400 includes an act 1402 of receiving an opt-in indication from a first computing device. For example, the act 1402 can include receiving, from a first computing device, an opt-in indication that a user of the first computing device has selected to permit a computing device to capture images of the user at a designated location. In one or more embodiments, the first computing device comprises a head-mounted-display device capable of providing an augmented reality display. Additionally, or alternatively, the second computing device can include a head-mounted-display device capable of providing an augmented reality display.

As shown, the series of acts 1400 also includes an act 1404 of transmitting an image-capture indication to a second computing device. For example, the act 1404 can include, based on receiving the opt-in indication, transmitting, to a second computing device, an image-capture indication to capture an image of the user of the first computing device at the designated location. In one or more embodiments, the image-capture indication comprises a user encryption code corresponding to the user of the first computing device. In some embodiments, the user encryption code comprises a public encryption key corresponding to the user of the first computing device and the public encryption key corresponds to a private encryption key of the user of the first computing device.

In one or more embodiments, the series of acts 1400 can also include acts for updating the second computing device regarding the location of the first computing device. For example, in one or more embodiments, the series of acts 1400 includes acts of receiving, from the first computing device, a location update indicating a current location of the first computing device; and transmitting the location update to the second computing device indicating the user of the first computing device is located at the designated location available for image capture.

The series of acts 1400 further includes an act 1406 of receiving a digital image from the second computing device. For example, the act 1406 can include receiving, from the second computing device, a digital image of the user of the first computing device. In one or more embodiments, the digital image is encrypted using the user encryption code. For example, in one or more embodiments, the series of acts 1400 further includes an act of encrypting the digital image using the user encryption code corresponding to the user of the first computing device.

Additionally, the series of acts 1400 includes an act 1408 of providing the digital image for access by the first computing device. As mentioned above, in one or more embodiments, the digital image is encrypted using the user encryption code corresponding to the user of the first computing device. In one or more embodiments, providing the digital image for access by the first computing device includes storing the digital image at a server or other storage device that is accessible to the first computing device. In some embodiments, providing the digital image for access includes transmitting the digital image to the first computing device. In one or more embodiments, the series of acts 1400 further includes an act of transmitting an image notification to the first computing device indicating that the digital image is available for access.

In one or more embodiments, the series of acts 1400 also includes acts for adding the digital image to an event album. Indeed, in one or more embodiments, the designated location corresponds to an event. Accordingly, the acts can include adding the digital image to an event album based on receiving an approval indication from the first computing device; and sending an album notification to a plurality of computing devices corresponding to the event notifying the plurality of computing devices of the event album comprising the digital image and an additional digital image from the event.

In some embodiments, the series of acts 1400 further includes acts for sharing the digital image based on geo-fencing parameters provided by the first client device. For example, the acts can include receiving one or more geo-fencing parameters indicating the designated location and an image-share request from the first computing device; and providing the digital image to one or more other computing devices within the designated location indicated by the one or more geo-fencing parameters based on the image-share request.

Turning now to the next figure, FIG. 15 shows a flowchart of a series of acts 1500 for capturing a digital image of a user in accordance with one or more embodiments. As an illustration, the series of acts 1500 are discussed as being performed by a particular computing device though, as discussed above, there are various ways in which the series of acts 1500 may be implemented. As shown, the series of acts 1500 includes an act 1502 of receiving an image-capture indication to capture a digital image of a user. For example, the act 1502 can include receiving an image-capture indication to capture a digital image of a user of a target computing device, the image-capture indication comprising a user encryption code corresponding to the user of the target computing device.

Additionally, as shown, the series of acts 1500 includes an act 1504 of detecting an image-capture trigger. In particular, the act 1504 can include detecting an image-capture trigger for capturing one or more digital images. In one or more embodiments, detecting the image-capture trigger includes detecting that the user of the target computing device is within a point of view for capturing the digital image of the user; detecting, via a machine learning model trained to capture digital images based on historically-favored-training images, that the point of view provides a favorable view; detecting a movement indication from an inertial measurement unit of the computing device indicating an accelerated movement or a speed above an image-capture threshold; detecting a voice cue from a user of the computing device; or detecting one or more physiological cues from the user of the computing device, the one or more physiological cues indicative of activity occurring within a detectable range of the user of the computing device.

Further, as shown, the series of acts 1500 includes an act 1506 of capturing one or more digital images of the user. For example, the act 1506 can include, based on detecting the image-capture trigger, capturing one or more digital images of the user of the target computing device.

The series of acts 1500 also includes an act 1508 of encrypting the one or more digital images. In particular, the act 1508 can include, based on detecting the image-capture trigger, encrypting the one or more digital images of the user utilizing the user encryption code corresponding to the user.

The series of acts 1500 further includes an act 1510 of providing the one or more digital images for access. For example, the act 1510 can include providing the one or more digital images of the user for access by the target computing device. As mentioned above, in one or more embodiments, providing the digital image(s) for access by the target computing device involves transmitting the digital image(s) directly to the target computing device (e.g., via a peer-topeer connection). In some embodiments, providing the digital image(s) for access can include transmitting the digital image(s) to a cloud server accessible to the target computing device.

In one or more embodiments, the act 1510 includes selecting, via a machine learning model trained to identify digital images based on historically-favored-training images, a subset of digital images from the one or more digital images of the user, the subset of digital images comprising a favorable image; and providing the one or more digital images of the user of the target computing device for access by the target computing device by providing the subset of digital images for access by the target computing device.

In one or more embodiments, the series of acts 1500 further include acts for requesting that an image of the user of the computing device be captured. For example, the acts can include detecting an additional image-capture trigger for capturing a digital image of a user of the computing device; and transmitting an image-capture request to the target computing device to capture the digital image of the user of the computing device. In one or more embodiments, detecting the additional image-capture trigger is based on at least one of a voice analysis of the user of the computing device; a heartbeat analysis of the user of the computing device; or movement of the user of the computing device.

In some embodiments, the series of acts 1500 further include acts for modifying the image of a user captured in a digital image based on a request of the user. For example, the acts can include receiving, from an additional computing device, a censorship request to censor digital images from including an image of an additional user of the additional computing device; determining that at least one digital image of the one or more digital images of the user includes the image of the additional user of the additional computing device; and modifying the at least one digital image to censor the image of the additional user of the additional computing device based on the censorship request. To illustrate, modifying the at least one digital image to censor the image of the additional user of the additional computing device can include, within the at least one digital image, blurring the image of the additional user of the additional computing device; replacing the image of the additional user of the additional computing device; or removing the image of the additional user of the additional computing device.

In still further embodiments, the series of acts 1500 include acts for not capturing an image of a user based on a request of the user. For example, the acts can include receiving an image-restriction indication to avoid capturing an image of an additional user of an additional computing device; detect an additional image-capture trigger for capturing additional digital images; determining that the additional user of the additional computing device is within view; and capturing one or more additional digital images without capturing a digital image of the additional user of the additional computing device based on the image-restriction indication.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
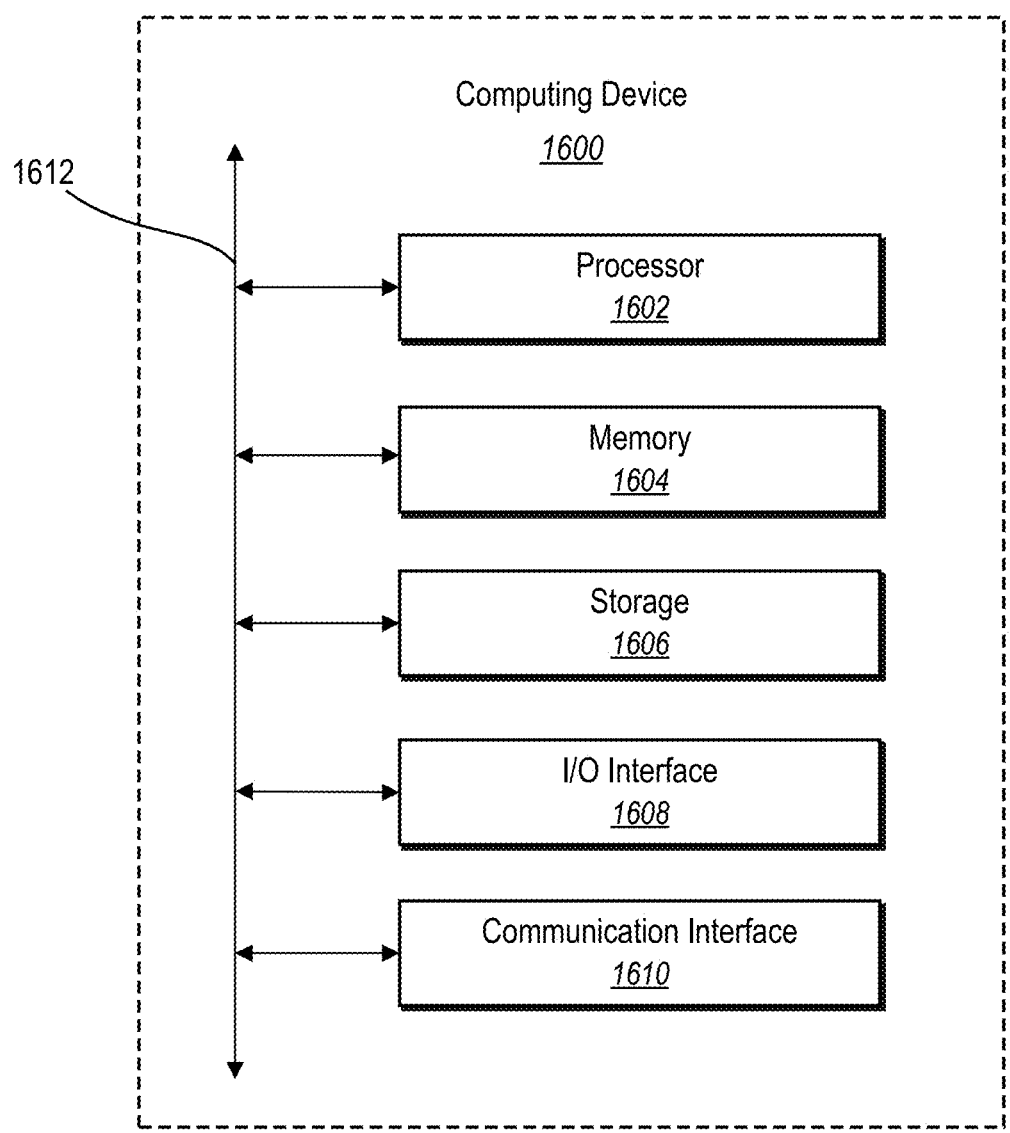
FIG. 16 illustrates a block diagram of an exemplary computing device in accordance with one or more embodiments.

FIG. 16 illustrates a block diagram of an example computing device 1600 that may be configured to perform one or more of the processes described above. One will appreciate that one or more computing devices, such as the computing device 1600 may represent the computing devices described above (e.g., the server(s) 102, the client devices 108a-108d, the client device 1302, and/or the server(s) 1304). In one or more embodiments, the computing device 1600 may be a mobile device (e.g., a mobile telephone, a smartphone, a PDA, a tablet, a laptop, a camera, a tracker, a watch, a wearable device, a head-mounted-display device, etc.). In some embodiments, the computing device 1600 may be a non-mobile device (e.g., a desktop computer or another type of client device). Further, the computing device 1600 may be a server device that includes cloud-based processing and storage capabilities.

As shown in FIG. 16, the computing device 1600 can include one or more processor(s) 1602, memory 1604, a storage device 1606, input/output interfaces 1608 (or "I/O interfaces 1608"), and a communication interface 1610, which may be communicatively coupled by way of a communication infrastructure (e.g., bus 1612). While the computing device 1600 is shown in FIG. 16, the components illustrated in FIG. 16 are not intended to be limiting. Additional or alternative components may be used in other embodiments. Furthermore, in certain embodiments, the computing device 1600 includes fewer components than those shown in FIG. 16. Components of the computing device 1600 shown in FIG. 16 will now be described in additional detail.

In particular embodiments, the processor(s) 1602 includes hardware for executing instructions, such as those making up a computer program. As an example, and not by way of limitation, to execute instructions, the processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 including storage for storing data or instructions. As an example, and not by way of limitation, the storage device 1606 can include a non-transitory storage medium described above. The storage device 1606 may include a hard disk drive (HDD), flash memory, a Universal Serial Bus (USB) drive or a combination these or other storage devices.

As shown, the computing device 1600 includes one or more I/O interfaces 1608, which are provided to allow a user to provide input to (such as user strokes), receive output from, and otherwise transfer data to and from the computing device 1600. These I/O interfaces 1608 may include a mouse, keypad or a keyboard, a touch screen, camera, optical scanner, network interface, modem, other known I/O devices or a combination of such I/O interfaces 1608. The touch screen may be activated with a stylus or a finger.

The I/O interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1608 are configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 provides one or more interfaces for communication (such as, for example, packet-based communication) between the computing device and one or more other computing devices or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can include hardware, software, or both that connects components of computing device 1600 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
receiving, from a first computing device, an opt-in indication that a user of the first computing device has selected to permit a computing device to capture images of the user at a designated location;
based on receiving the opt-in indication, transmitting, to a second computing device, an image-capture indication to capture an image of the user of the first computing device at the designated location, the image-capture indication comprising a user encryption code that prevents the second computing device from displaying captured images of the user after the captured images have been encrypted;
providing, to the second computing device, a machine learning model trained to detect when a point of view comprises a favorable view for capturing one or more digital images based on a predicted popularity of the point of view among one or more social media platforms;
receiving, from the second computing device, a digital image of the user of the first computing device, the digital image captured via a camera of the second computing device based on the favorable view detected via the machine learning model and encrypted using the user encryption code to prevent the second computing device from displaying the digital image; and
providing the digital image for access by the first computing device.

2. The method of claim 1, further comprising transmitting an image notification to the first computing device indicating that the digital image is available for access.

3. The method of claim 1, wherein the designated location corresponds to an event and further comprising:
adding the digital image to an event album based on receiving an approval indication from the first computing device; and
sending an album notification to a plurality of computing devices corresponding to the event notifying the plurality of computing devices of the event album comprising the digital image and an additional digital image from the event.

4. The method of claim 1, further comprising:
receiving one or more geo-fencing parameters indicating the designated location and an image-share request from the first computing device; and
providing the digital image to one or more other computing devices within the designated location indicated by the one or more geo-fencing parameters based on the image-share request.

5. The method of claim 1, further comprising:
receiving, from the first computing device, a location update indicating a current location of the first computing device; and
transmitting the location update to the second computing device indicating the user of the first computing device is located at the designated location available for image capture.

6. The method of claim 1, wherein the first computing device comprises a head-mounted-display device capable of providing an augmented reality display.

7. The method of claim 1, wherein the user encryption code comprises a public encryption key corresponding to the user of the first computing device and the public encryption key corresponds to a private encryption key of the user of the first computing device.

8. The method of claim 1, wherein transmitting the image-capture indication that includes the user encryption code that prevents the second computing device from displaying the captured images of the user comprises transmitting the image-capture indication that includes the user encryption code that further prevents the second computing device from storing or transmitting unencrypted images of the user.

9. The method of claim 1, wherein providing the machine learning model trained to detect when the point of view comprises the favorable view based on the predicted popularity of the point of view among the one or more social media platforms comprises providing the machine learning model trained to detect when the point of view comprises the favorable view based on a predicted number of shares or a predicted number of likes on the one or more social media platforms.

10. A non-transitory computer-readable medium comprising instructions that, when executed by at least one processor, cause a computing device to:
receive an image-capture indication to capture a digital image of a user of a target computing device, the image-capture indication comprising a user encryption code that prevents the computing device from displaying captured images of the user after the captured images have been encrypted;
receive a machine learning model trained to detect when a point of view comprises a favorable view for capturing one or more digital images based on a predicted popularity of the point of view among one or more social media platforms;
detect an image-capture trigger for capturing one or more digital images based on the favorable view detected via the machine learning model;
based on detecting the image-capture trigger:
capture, via a camera of the computing device, one or more digital images of the user of the target computing device; and encrypt the one or more digital images of the user utilizing the user encryption code to prevent the computing device from displaying the one or more digital images; and provide the one or more digital images of the user for access by the target computing device.

11. The non-transitory computer-readable medium of claim 10,
further comprising instructions that, when executed by the at least one processor, cause the computing device to further detect the image-capture trigger for capturing the one or more digital images by:
detecting that the user of the target computing device is within a point of view for capturing the digital image of the user;
detecting a movement indication from an inertial measurement unit of the computing device indicating an accelerated movement or a speed above an image-capture threshold;
detecting a voice cue from a user of the computing device; or
detecting one or more physiological cues from the user of the computing device, the one or more physiological cues indicative of activity occurring within a detectable range of the user of the computing device.

12. The non-transitory computer-readable medium of claim 10, further comprising instructions that, when executed by the at least one processor, cause the computing device to:
detect an additional image-capture trigger for capturing a digital image of a user of the computing device; and
transmit an image-capture request to the target computing device to capture the digital image of the user of the computing device.

13. The non-transitory computer-readable medium of claim 12, further comprising instructions that, when executed by the at least one processor, cause the computing device to detect the additional image-capture trigger based on at least one of:
a voice analysis of the user of the computing device;
a heartbeat analysis of the user of the computing device; or
movement of the user of the computing device.

14. The non-transitory computer-readable medium of claim 10, further comprising instructions that, when executed by the at least one processor, cause the computing device to:
receive, from an additional computing device, a censorship request to censor digital images from including an image of an additional user of the additional computing device;
determine that at least one digital image of the one or more digital images of the user includes the image of the additional user of the additional computing device; and
modify the at least one digital image to censor the image of the additional user of the additional computing device based on the censorship request.

15. The non-transitory computer-readable medium of claim 14, further comprising instructions that, when executed by the at least one processor, cause the computing device to modify the at least one digital image to censor the image of the additional user of the additional computing device by, within the at least one digital image:
blurring the image of the additional user of the additional computing device;
replacing the image of the additional user of the additional computing device; or
removing the image of the additional user of the additional computing device.

16. The non-transitory computer-readable medium of claim 10, further comprising instructions that, when executed by the at least one processor, cause the computing device to:
receive an image-restriction indication to avoid capturing an image of an additional user of an additional computing device;
detect an additional image-capture trigger for capturing additional digital images;
determining that the additional user of the additional computing device is within view; and
capturing one or more additional digital images without capturing a digital image of the additional user of the additional computing device based on the image-restriction indication.

17. A system comprising:
at least one processor; and
at least one non-transitory computer-readable medium comprising instructions that, when executed by the at least one processor, cause the system to:
receive, from a first computing device, an opt-in indication that a user of the first computing device has selected to permit a computing device to capture images of the user at a designated location;
based on receiving the opt-in indication, transmit, to a second computing device, an image-capture indication to capture an image of the user of the first computing device at the designated location, the image-capture indication comprising a user encryption code that prevents the second computing device from displaying captured images of the user after the captured images have been encrypted;
provide, to the second computing device, a machine learning model trained to detect when a point of view comprises a favorable view for capturing one or more digital images based on a predicted popularity of the point of view among one or more social media platforms;
receive, from the second computing device, a digital image of the user of the first computing device, the digital image captured via a camera of the second computing device based on the favorable view detected via the machine learning model and encrypted using the user encryption code to prevent the second computing device from displaying the digital image; and
provide the digital image for access by the first computing device, the digital image encrypted using the user encryption code.

18. The system of claim 17, further comprising instructions that, when executed by the at least one processor, cause the system to encrypt the digital image using the user encryption code corresponding to the user of the first computing device.

19. The system of claim 17, further comprising instructions that, when executed by the at least one processor, cause the system to transmit an image notification to the first computing device indicating that the digital image is available for access.

20. The system of claim 17, further comprising instructions that, when executed by the at least one processor, cause the system to:

receive one or more geo-fencing parameters indicating the designated location and an image-share request from the first computing device; and provide the digital image to one or more other computing devices within the designated location indicated by the one or more geo-fencing parameters based on the image-share request.

\* \* \* \* \*